United States Patent
Shah et al.

(10) Patent No.: US 10,681,607 B2
(45) Date of Patent: Jun. 9, 2020

(54) RECEIVE-SIDE SCALING FOR WIRELESS COMMUNICATION DEVICES

(71) Applicant: Intel Corporation, Santa Clara, CA (US)

(72) Inventors: Nirav Shah, Hillsboro, OR (US); Pabitra Dalai, Portland, OR (US); El-Houari Soussi, Beaverton, OR (US); Rene Van Ee, Hillsboro, OR (US); Gaurish Deuskar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/016,118

(22) Filed: Jun. 22, 2018

(65) Prior Publication Data

US 2019/0045421 A1     Feb. 7, 2019

(51) Int. Cl.
| | |
|---|---|
| *G01R 31/01* | (2020.01) |
| *H04W 40/02* | (2009.01) |
| *H04L 12/743* | (2013.01) |
| *H04L 29/08* | (2006.01) |
| *H04L 29/06* | (2006.01) |
| *H04L 12/933* | (2013.01) |
| *H04L 12/935* | (2013.01) |

(52) U.S. Cl.
CPC ......... *H04W 40/02* (2013.01); *H04L 45/7453* (2013.01); *H04L 45/7457* (2013.01); *H04L 49/109* (2013.01); *H04L 49/3009* (2013.01); *H04L 69/22* (2013.01); *H04L 69/324* (2013.01); *H04L 69/16* (2013.01)

(58) Field of Classification Search
USPC ....... 370/351, 368, 249, 250, 252, 253, 360, 370/377, 386, 389, 394, 395.1, 395.31, 370/432, 465, 471
See application file for complete search history.

(56) References Cited

U.S. PATENT DOCUMENTS

| | | | | |
|---|---|---|---|---|
| 9,569,383 | B2 * | 2/2017 | Domsch | G06F 9/5005 |
| 2003/0081615 | A1 * | 5/2003 | Kohn | G06F 1/3203 |
| | | | | 370/395.42 |
| 2018/0368047 | A1 * | 12/2018 | Patil | H04W 40/12 |

OTHER PUBLICATIONS

"Scaling in the Linux Networking Stack", retrieved on Jul. 23, 2018, 7 pages, https://www.kernel.org/doc/Documentation/networking/scaling.txt.

(Continued)

*Primary Examiner* — Phuongchau Ba Nguyen
(74) *Attorney, Agent, or Firm* — Schwabe, Williamson & Wyatt, P.C.

(57) ABSTRACT

Systems, methods, and computer-readable storage media for an enhanced RSS (eRSS) mechanisms are provided. The eRSS mechanisms may involve routing received data packets to application processor cores based on network-specific identifier(s), such as an Evolved Packet System (EPS) bearer identity (ID), a Packet Data Network (PDN) ID, an Access Point Name (APN), or a Quality of Service (QoS) Flow Identifier (QFI). The network-specific IDs may be located in a layer 2 (L2) protocol stack, which may be stored in cache for use by different layers in the L2 protocol stack. In this way, the network-specific IDs may be readily available for use by the eRSS mechanism, which may improve cache efficiency and reduce storage overhead. Other embodiments may be described and/or claimed.

25 Claims, 16 Drawing Sheets

(56) References Cited

OTHER PUBLICATIONS

Ted Hudek, "Introduction to Receive Side Scaling", Apr. 20, 2017, 4 pages, https://docs.microsoft.com/en-us/windows-hardware/drivers/network/introduction-to-receive-side-scaling.
Ted Hudek, "Non-RSS Receive Processing", Apr. 20, 2017, 2 pages.
Santosh Nagaraj, "Spectrum shaping for backscatter modulation", Sep. 30, 2017, 4 pages.
Ghasem Ahmadeyan Mazhin et al., "Multi-layer architecture for realization of network virtualization using MPLS technology", Jan. 17, 2016, 5 pages.
Yeongjin Kim et al., "Multi-flow management for mobile data offloading", Jul. 25, 2016, 5 pages.
Duncan MacMichael, Receive Side Scaling Version 2 (RSSv2), Oct. 12, 2017, 3 pages, https://docs.microsoft.com/en-us/windows-hardware/drivers/network/receive-side-scaling-version-2-rssv2-.
"The LTE Network Architecture—A comprehensive tutorial", 2009, 26 pages, www.alcatel-lucent.com.
Bon-Hong Koo et al., "Joint assignment of frequency and polarization to minimize the chromatic number", Jul. 21, 2016, 5 pages.
Zhiwei Yan et al., "ISBORD: Internet Searching based on Resource Description", Sep. 19, 2016, 4 pages.
Sanghyun Ahn, "Geographic information-based data delivery in vehicular networks: A survey", Jan. 3, 2017, 5 pages.
Ping Zhang et al., "Cooperative localization in 5G networks: A survey", Feb. 9, 2017, 6 pages.
Rashmi Sharan Sinha et al., "A survey on LPWA technology: LoRa and NB-IoT", Jan. 4, 2017, 8 pages.
Hyeon Min Kim et al., "An efficient beamforming design for multipair full-duplex relaying systems", Jan. 9, 2017, 5 pages.
"3rd Generation Partnership Project; Technical Specification Group Radio Access Network; Study on New Radio Access Technology; Radio Interface Protocol Aspects (Release 14)" Mar. 2017, 57 pages, 3GPP TR 38.804, v14.0.0.
"3rd Generation Partnership Project; Technical Specification Group Radio Access Network; Study on new radio access technology: Radio access architecture and interfaces (Release 14)" Mar. 2017, 91 pages, 3GPP TR 38.801 v14.0.0.
"3rd Generation Partnership Project; Technical Specification Group Radio Access Network; NR; Packet Data Convergence Protocol (PDCP) specification (Release 15)", Mar. 2018. 25 pages, 3GPP TS 38.323 v15.1.0.
"3rd Generation Partnership Project; Technical Specification Group Radio Access Network; NR; Radio Link Control (RLC) protocol specification (Release 15)" Mar. 2018, 33 pages, 3GPP TS 38.322 v15.1.0.
"3rd Generation Partnership Project; Technical Specification Group Radio Access Network; NR; Medium Access control (MAC) protocol specification (Release 15)", Mar. 2018, 67 pages, 3GPP TS 38.321 v15.1.0.
"3rd Generation Partnership Project; Technical Specification Group Radio Access Network; Evolved Universal Terrestrial Radio Access (E-UTRA); Radio Resource Control (RRC); Protocol specification (Release 15)" Mar. 2018, 786 pages, 3GPP TS 36.331 v15.1.0.
"3rd Generation Partnership Project; Technical Specification Group Radio Access Network; Evolved Universal Terrestrial Radio Access (E-UTRA); Packet Data Convergence Protocol (PDCP) specification (Release 14)" Dec. 2017, 43 pages, 3GPP TS 36.323 v14.5.0.
"3rd Generation Partnership Project; Technical Specification Group Radio Access Network; Evolved Universal Terrestrial Radio Access (E-UTRA); Radio Link Control (RLC) protocol specification (Release 15)", Apr. 2018, 45 pages, 3GPP TS 36.322 v15.0.1.
"3rd Generation Partnership Project; Technical Specification Group Radio Access Network; Evolved Universal Terrestrial Radio Access (E-UTRA); Medium Access Control (MAC) protocol specification (Release 15)", Mar. 2018, 109 pages, 3GPP TS 36.321 v15.1.0.
"3rd Generation Partnership Project; Technical Specification Group Services and System Aspects; Study on Architecture for Next Generation System (Release 14)", Dec. 2016, 522 pages, 3GPP TR 23/99 v14.0.0.
Junseok Kim et al., "3GPP SA2 architecture and functions for 5G mobile communication system", Jan. 16, 2017, 8 pages.

\* cited by examiner

900

US 10,681,607 B2

RECEIVE-SIDE SCALING FOR WIRELESS COMMUNICATION DEVICES

TECHNICAL FIELD

The present disclosure relates to the field of computer processor devices and wireless communication devices. More particularly, the present disclosure relates to systems, apparatuses, methods, and computer-readable media for receive side scaling (RSS) for wireless communication devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Receive-side scaling (RSS) is a network interface card (NIC) technology that involves routing data packets to different processor cores of an application processor. In RSS, the NIC may send different received packets to different receive queues to distribute processing among processor cores. The NIC distributes packets by applying a filter to each packet, where the filter assigns each packet to a logical flow of a number of logical flows. Packets for each logical flow are sent to a separate receive queue associated with a processor core, where each processor core obtains packets to process from their corresponding receive queue.

The existing RSS filter is a hash of network and/or transport layer headers, for example, a 4-tuple hash over IP addresses and TCP ports of a packet. This involves calculating a hash using the values of IP and TCP header fields of each IP packet including a source address, destination address, source port, and destination port to obtain a key. The key is used for a hash table lookup operation to find a processor core identifier (ID) or a receive queue number. For example, where a 128-entry indirection table is used, the receive queue for a packet may be determined by masking out the low order seven bits of the computed hash for a packet, using this number as the key into the indirection table, and reading the corresponding value from the table. Once the processor core ID/receive queue number is obtained, the data packet is sent to the processor core associated with the processor core ID. Performing the hash operation for each IP packet requires a relatively large amount of computational resources. Given the limited processing power of baseband processors of Fourth Generation (4G)/Fifth Generation (5G) modems, such costly hash operations performed for each IP packet may degrade downlink (DL) throughput.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
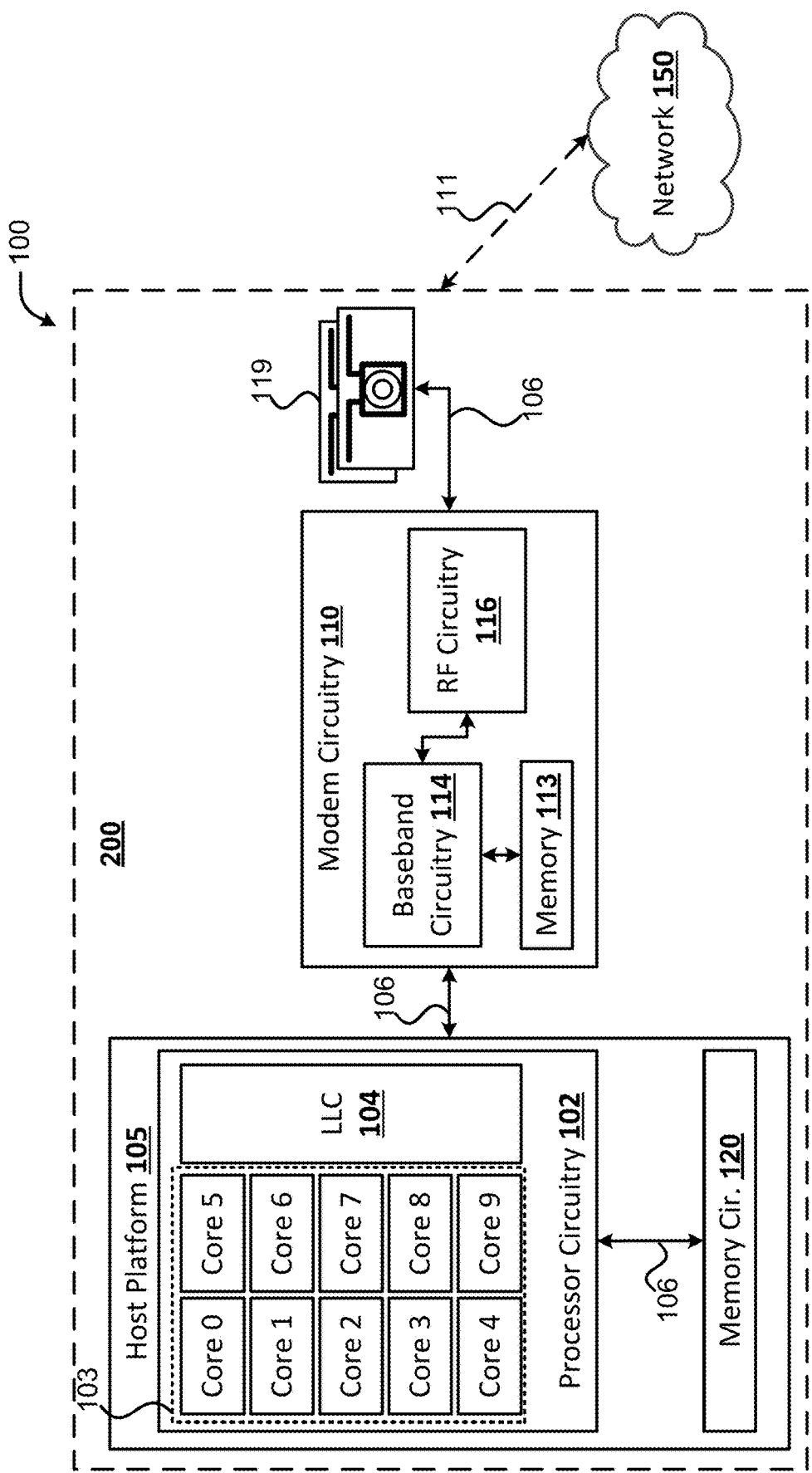
FIG. 1 illustrates an arrangement in which various embodiments may be practiced.

Embodiments are related to improving receive side scaling (RSS) for mobile devices. RSS is a network interface card technology that involves routing data packets to different processor cores of an application processor. The existing RSS approach involves calculating a hash using the values of IP and TCP header fields of each IP packet including a source address/identifier (ID), destination address/ID, source port, and destination port to obtain a key. The key is used for a hash table lookup operation to find a processor core ID. Once the processor core ID is obtained, the data packet is sent to the processor core associated with the processor core ID. Performing the hash operation for each IP packet requires a relatively large amount of computational resources. Given the limited processing power of baseband processors of Fourth Generation (4G)/Fifth Generation (5G) modems, such costly hash operations performed for each IP packet may degrade downlink (DL) throughput.

The disclosed embodiments provide an enhanced RSS (eRSS) mechanism, where data packets obtained over a wireless network are routed to application processor cores based using network-specific identifier(s) (NSI(s)) as an input to the hash function. In these embodiments, the NSI(s) may be specific to the radio technology. Radio Access Technology (RAT), and/or communication protocol used by the network or otherwise used for communicating the packets. As an example, where the network is a Fourth Generation (4G) Long Term Evolution (LTE) cellular network, the eRSS mechanism may involve calculating a hash using an Evolved Packet System (EPS) bearer identity (ID) and/or a Packet Data Network (PDN) ID (also referred to as a "Access Point Name" or "APN"). In another example where the network is a Fifth Generation (5G) New Radio (NR) cellular network, the enhanced RSS mechanism may involve calculating a hash using a QoS Flow Identifier (QFI) rather than an EPS bearer ID since 5G standard removes the concept of bearers. In these examples, the EPS bearer ID or QFI may be located in a layer 2 (L2) protocol stack. Since L2 protocol stack information is stored in cache and used for different layers in the L2 protocol stack, the EPS bearer ID and QFI may be readily available for use by the eRSS mechanism, which may improve cache efficiency and reduce storage overhead. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in various embodiments," "in some embodiments," and the like are used repeatedly. These phrases generally do not refer to the same embodiments; however, they may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous. The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. Example Embodiments

FIG. 1 illustrates an arrangement 100 in which various embodiments may be practiced. Arrangement 100 includes computer system 200 (or "system 200") and network 150. FIG. 1 shows a block diagram of an example of components that may be present in the computer system 200. The computer system 200 may include processor circuitry 102 with one or more processor cores 103 and any combinations of the remaining components shown in the example. The processor circuitry 102 and the remaining components may be implemented as ICs, portions thereof, discrete electronic devices, or other modules, logic, hardware, software, firmware, or a combination thereof adapted in the computer system 200, or as components otherwise incorporated within a chassis of a larger system. The block diagram of FIG. 1 is intended to show a high level view of components of the computer system 200. However, some of the components shown may be omitted, additional components may be present, and different arrangement of the components shown may occur in other implementations.

The computer system 200 may be embodied as any type of computation or computer device capable of performing various arithmetic, logical, input/output (I/O) operations, including, without limitation, sending and receiving packets to remote devices over network 150. In this regard, the system 200 may include processors, memory devices, I/O interfaces, network interface cards, various radio communications devices, and/or other like components. As examples, the system 200 may include or may be employed as a mobile device (e.g., a smartphone, a wearable computer device, a tablet computer, a laptop or notebook computer, etc.), a desktop computer, workstation, in-vehicle computing system, Internet of Things (IoT) devices, and/or the like. In FIG. 1 and in other example embodiments discussed herein, the system 200 may be depicted as a user, client, or edge computer device/system; however, in other embodiments, the system 200 may include or may be employed as a network element (e.g., a wireless access point, a network switch and/or a network router, a base station, and the like) in a wired or wireless communication network, or a server computer system.

According to various embodiments, the system 200 may include the enhanced receive side scaling (eRSS) technology discussed herein. In such embodiments, data packets obtained over network 150 are routed to a processor core 103 of the processor circuitry 102 based using network-specific identifier(s) as an input to a hash function. In some embodiments, the network-specific identifier(s) may be one or more session identifiers or network identifiers, such as an Evolved Packet System (EPS) bearer identity/identifier (ID), a Packet Data Network (PDN) ID (also referred to as a "Access Point Name" or "APN"), a Quality of Service (QoS) Flow Identifier (QFI), or some other suitable identifier. Examples of such embodiments are discussed in more detail infra with respect to FIG. 2.

Referring back to FIG. 1, network 150 may comprise various computer systems, network connections among the computer systems, and software routines to enable communication between the computer systems over network connections. In this regard, the network 150 may comprise one or more network elements that may include one or more processors, communications systems (e.g., including network interface controllers, one or more transmitters/receivers connected to one or more antennas, etc.), and computer-readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. In this example, system 200 is connected with network 150 via connection (link) 111. Connection 111 to the network 150 may be via a wired or a wireless connection using one or more communication protocols, such as those discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection 111 to the network 150 may require that system 200 and/or the computer systems of the network 150 execute software routines which enable, for example, the seven layers of the Open System Interconnection (OSI) model of computer networking or equivalent in a wireless (cellular) phone network.

Network 150 may be used to enable relatively long-range communication such as, for example, between the system 200 and one or more remote systems or devices. The network 150 may represent the Internet, one or more cellular networks, a local area network (LAN), a wireless LAN (WLAN), or a wide area network (WAN) including proprietary and/or enterprise networks, or combinations thereof. In some embodiments, the network 150 may be associated with a network operator who owns or controls equipment and other elements necessary to provide network-related services, such as one or more base stations or access points, one or more servers for routing digital data or telephone calls (for example, a core network or backbone network), etc. In some embodiments, the system 200 may be part of the infrastructure that provides network-related services to system 200

FIG. 1 also shows an example implementation of system 200 according to various embodiments. In this example, the system 200 includes a host platform 105, modem circuitry 110, and printed antennas 119, each of which are coupled via interconnects (IX) 106. In this embodiment, the modem circuitry 110 may include IX interface circuitry, baseband circuitry 114, in-package memory circuitry 113, and radiofrequency (RF) circuitry 116. Each of the host platform 105, modem circuitry 110, and antennas 119 may comprise a Systems on Chip (SoC), System-in-Package (SiP), multi-chip packages (MCPs), or the like, each of which may include one or more integrated circuits (ICs), chips, or other like semiconductor devices formed on a single unifying substrate (e.g., a single semiconductor package, a single printed circuit board (PCB), of the like). The following description is provided for examples where the memory circuitry 113, baseband circuitry 114, and RF circuitry 116 are disposed on a single MCP; however, the example embodiments are not limited in this regard and the described embodiments may apply to other arrangements that may benefit from the principles described herein, such as where the memory circuitry 113, baseband circuitry 114, and/or RF circuitry 116 reside on respective chips or packages.

Host platform 105 may be an MCP or a collection of chips/circuitry that includes processor circuitry 102 and memory circuitry 120, which act(s) in concert to execute program code to carry out various tasks. The processor circuitry 102 comprises one or more processing elements configured to perform basic arithmetical, logical, and input/output operations by carrying out instructions. The processor circuitry 102 includes cores 103 and last level cache (LLC) 104. Each of the cores 103 are a component that includes two or more processing units that read and execute program code. Each core 103 includes hardware components to fetch and decode instructions, schedule instructions for execution, execute the instructions, fetch data for instruction execution, and store data produced by execution of instructions. The LLC 104 may be embodied as a type of cache memory that the processor circuitry 102 can access more quickly than the memory circuitry 120 for storing instructions and/or data for execution. The LLC 104 may be the highest-level cache that is called before accessing memory circuitry 120. In some embodiments, the LLC 104 may be an on-die cache, while in other embodiments, the LLC 104 may be an off-die cache that resides on the same IC or SoC as the processor circuitry 102. Although not shown, the processor circuitry 102 may also comprise level (L)1, L2, or L3 cache devices.

The processor circuitry 102 communicates with a memory circuitry 120 over IX 106. Memory circuitry 120 may be circuitry configured to store data, program code, or logic for operating the system 200. Memory circuitry 120 may include a number of memory devices that may be used to provide a given amount of system memory. The IXs (or "links") 106 may include one or any number (or combination) of interconnect and/or bus technologies used to convey data between host platform 105 and modem circuitry 110, and between various other components of the system 200.

The modem circuitry 110 includes baseband circuitry 114, and in-package memory circuitry 113. In the embodiment shown by FIG. 1, the modem circuitry 110 includes RF circuitry 116 (also referred to as "transceiver circuitry" or the like), while in other embodiments the modem circuitry 110 may reside on a separate chip or package that an chip/package of the RF circuitry 116. The antennas 119 may be microstrip antennas or printed antennas that are fabricated on the surface of one or more PCBs. The antennas 119 may be formed in as a patch of metal foil (e.g., a patch antenna) in a variety of shapes, and may be coupled with the RF circuitry 116 using metal transmission lines or the like.

The in-package memory circuitry 113 is circuitry configured to store data, program code, or logic for operating the modem circuitry 110. The in-package memory circuitry 113 may include the same or similar memory devices discussed previously with regard to memory circuitry 120. In an example implementation, the in-package memory circuitry 113 may be a double data rate (DDR) SDRAM circuit (e.g., DDR1, DDR2, DDR3, DDR4, and future DDR implementations) that may operate in conjunction with a DDR bus/IX 106. The DDR bus/IX 106 may be any suitable bus or IX technology (such as those discussed herein) that provides for data transfers on both the rising and falling edges of a clock signal. Although DDR is used as an example for the in-package memory circuitry 113 throughout the present disclosure, the embodiments herein should not be construed as limited to using such technologies and the embodiments discussed herein may be applicable to any type or combination of memory technologies. As used herein, the term "in-package memory" may refer to a memory device or circuitry that is integrated in a same package or SiP as the baseband circuitry 114. Additionally, as used herein the term "off-chip memory" may refer to a memory device or circuitry that is integrated in a different IC or SoC than the baseband circuitry 114, and the terms "off-board" or "off-package" may refer to a memory device or circuitry that is mounted on a separate PCB than the baseband circuitry 114. Furthermore, the term "in-package memory" may refer to an off-chip memory device or circuitry that is integrated in a different IC or SoC than the baseband circuitry 114 but is mounted on a same PCB or the same package as the baseband circuitry 114 (e.g., an MCP). However, the terms "off-chip," "off-board," or "in-package" may be used interchangeably throughout the present disclosure unless explicitly stated otherwise.

In various embodiments, the in-package memory circuitry 113 stores program code and/or data structures for the eRSS mechanisms discussed herein. For example, the in-package memory circuitry 113 stores a processor core lookup table (PCLT). The PCLT maps network-specific identifiers (NSIs) to core identifiers (CIDs) of a plurality of NSI-CID pairs for the plurality of cores 103 of application processor circuitry 102 of a host platform 105 to which the modem circuitry 110 is coupled. In this example, the memory circuitry 113 also stores program code, firmware, logic blocks, etc. of an eRSS entity. The baseband circuitry 114 operates the eRSS entity to extract, from one or more data packets received by the baseband circuitry 114, an NSI of the data packets, performs a lookup operation on the PCLT using the extracted NSI to obtain a core ID, and sends or otherwise transfers the data packets to a core 103 of the application processor circuitry 102 that is associated with the determined CID. The eRSS mechanisms are discussed in more detail with regard to FIG. 2.

Figure 2:
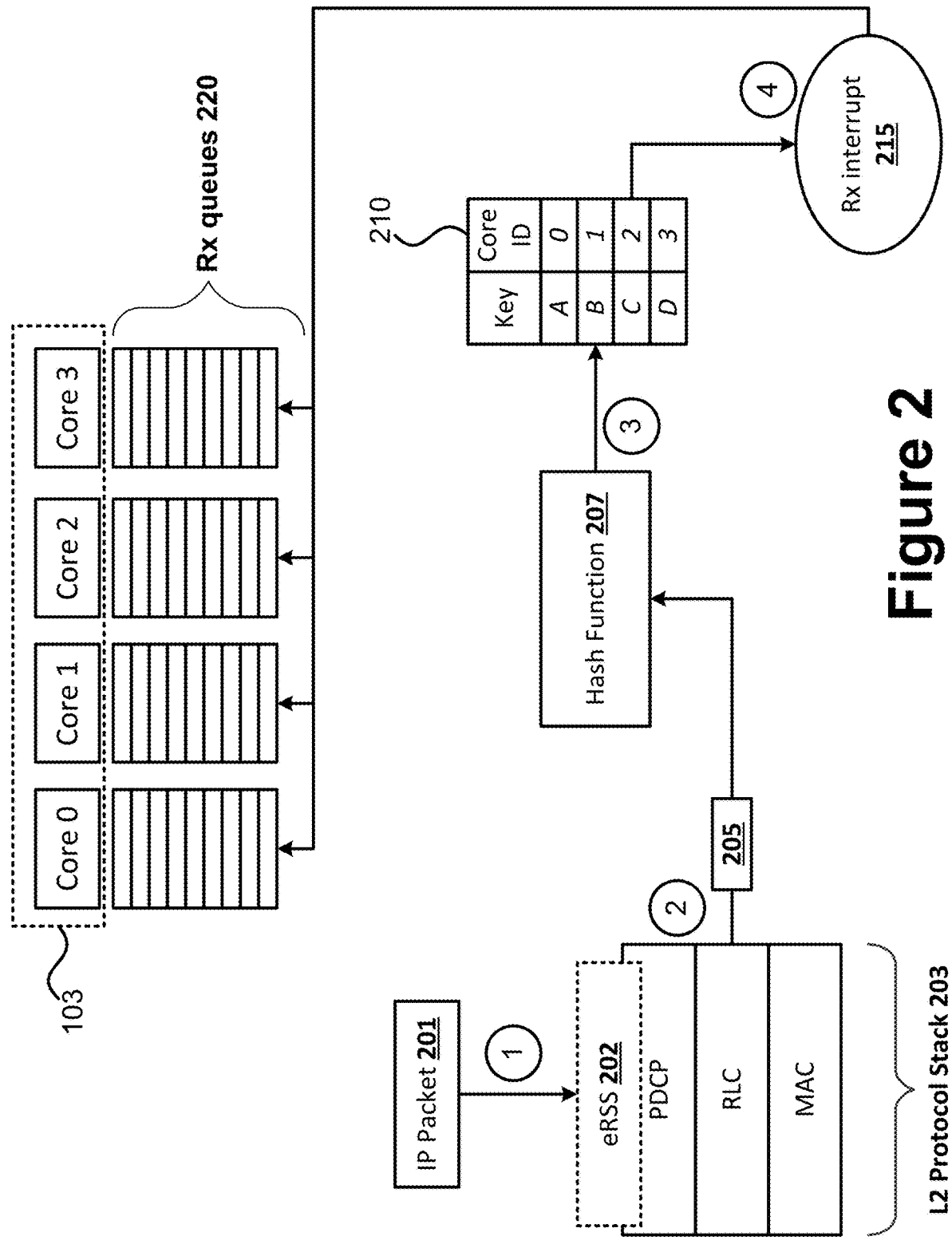
FIG. 2 illustrates logical interactions for enhanced received side scaling (eRSS) mechanisms, according to various embodiments.

FIG. 2 shows logical interactions for the eRSS mechanisms discussed herein. According to various embodiments, the modem circuitry 110 discussed previously is RSS capable in that the modem circuitry 110 provides multiple receive (Rx) queues 220 for the processor circuitry 102 of the host platform 105, including an Rx queue 220 for each core 103. In various embodiments, the Rx queues 220 are located in the memory circuitry 120 (e.g., RAM) of the host platform 105. In some embodiments, the Rx queues 220 may be implemented in the EP or in the in-package memory circuitry 113 and/or the on-chip memory circuitry of the modem circuitry 110.

The eRSS mechanism begins at node 1 where the eRSS entity 202 obtains a data packet 201 (e.g., an IP packet). In this example, the eRSS 202 may reside in a layer 2 (L2) protocol stack 203 on top of the Packet Data Convergence Protocol (PDCP) layer that receives the IP packet 201. However, other arrangement are possible in other embodiments, for example, the eRSS 202 may be incorporated into the PDCP layer, or the eRSS 202 may be separate from the L2 stack 203 and coupled with the PDCP layer via a suitable API, middleware, software connector, software glue, or the like.

In addition to the eRSS and the PDCP layer, the L2 stack 203 comprises a Medium Access Control (MAC) layer, a Radio Link Control (RLC) layer. These layers perform various functions such as enciphering/de-ciphering, encapsulation/decapsulation, (re-)ordering of packets, mapping of data radio bearers (DRBs) to transport channels, etc. In Fifth Generation (5G) New Radio (NR) implementations, a Service Data Adaptation Protocol (SDAP) layer may also be included in the L2 protocol stack to map DRBs and Quality of Service (QoS) flows based on, inter alia, QoS profiles. These functions and services are discussed in more detail with regard to FIG. 15 infra. Although the description of the L2 protocol stack 203 provided herein is based 3GPP (e.g., 5G NR and LTE) system standards, some or all of the aspects of the L2 protocol stack 203, including the location and use of the eRSS 202, may be applicable to other wireless communication networks/systems as well, such as WiFi networks (e.g., IEEE 802 protocols) and/or the like. For example, the L2 protocol stack 203 for a WiFi (IEEE 802) implementation may include Data Link layer entities such as MAC and Logical Layer Control (LLC) layers/entities.

At node 2, the eRSS 202 identifies a network-specific identifier (NSI) 205 (or a "session identifier 205", or "stream identifier 205"), and inputs the NSI 205 to a hash function 207. In some embodiments, the eRSS 202 may extract or otherwise identify the NSI 205 from the IP packet 201 (or a relevant portion of the IP packet 205). In some embodiments, the eRSS 202 may obtain a descriptor file from the L2 stack, which may include a value of the NSI 205, an RLC or PDCP sequence number (SN), and other like information. In such embodiments, the descriptor file may be generated based on a configuration of the PDCP by higher layers (e.g., a radio resource control (RRC) layer, not shown by FIG. 2). In one example, the NSI may be a data radio bearer (DRB)

ID, which may be indicated by a drb-Identity field or an eps-BearerIdentity field of a drb-ToAddModList information element (IE) or drb-ToAddModListSCG IE in an RRC (re-) configuration message. In some cases, the drb-ToAddModList IE or drb-ToAddModListSCG IE may be fields included in a RadioResourceConfigDedicated-NB IE or a RadioResourceConfigDedicated-NB IE of the RRC message.

At node 3, the eRSS 202 performs a lookup operation on the PCTL 210 (also referred to as an "indirection table") to obtain a core identifier (ID) of a processor core 103. The PCTL 210 may be embodied as a hash table; however, in other embodiments, the PCTL 210 may be structure or embodied as some other a collection or grouping of network-specific IDs to core IDs. In one example, the PCTL 210 may be embodied as a hash table that stores key-value pairs. In this example, the NSI may be a key that may be used to obtain an index that indicates where a value (e.g., a core ID) of the key-value pair may be found in the PCTL 210. In this example, the PCTL 210 may be built using the perfect hashing scheme, cuckoo hashing, or some other suitable hashing scheme. In some embodiments, the PCTL 210 may be an associative array that stores key-value pairs, attribute-value pairs, or tuples in the form of <network_specific_ID, core_ID> or the like. The PCTL 210 may be built or formed using any other suitable mechanism/procedure in other embodiments, and the methods/procedures to access the core ID may be based on how the PCTL 210 is constructed.

The PCTL 210 may be programmed or configured at the time of initialization of the modem circuitry 110, during an attach procedure for establishing a DRB or QoS flow with the network, or at some other suitable time. A default mapping may be used to distribute the Rx queues 220 evenly in the PCTL 210, however, the PCTL 210 may be retrieved and modified during runtime, which may be done to give different Rx queues 220 (or different cores 103) different relative weights or priorities.

For the given IP packet 201, the eRSS may pull in the NSI value identified at node 2, and may calculate a hash value using the hash function 207. In some embodiments, a hash map or associative array that maps keys to values using the hash function 207 may be used. In either embodiment, the eRSS may apply the key (e.g., the network-specific ID or session ID) to the hash function 207 to obtain an index (also referred to as a "core index" or the like) that points to a location where the value (e.g., the core ID) is stored (e.g., a memory location in in-package memory circuitry 113 of FIG. 1). In some embodiments, the index may be a table position in the PCLT 210, and the index computed using the hash function 207 may point to the table position.

In any of the aforementioned embodiments, computing the hash value may be an O(1) complexity operation (e.g., where the complexity is constant regardless of the number of inputs). This is different than conventional RSS mechanisms since conventional RSS mechanisms require more complex operations to route packets to a desired core 103. For example, the conventional RSS approach (also known as "IP flow based RSS") requires calculating a hash using an IP and TCP header fields of an IP packet that is received by the modem circuitry 110. The IP and TCP header field information used to calculate the hash includes a source IP address, a destination IP address, a source port number/address, and a destination port number/address. The processor core ID may be discovered using this hash and a hash lookup table, however, the complexity of the hash calculation requires more computational resources than those of the eRSS mechanisms discussed herein. This is because the network-specific ID (e.g., in the descriptor file) may already be loaded in the cache of the modem circuitry 110 (e.g., the in-package memory circuitry 113) to be used for various network/radio control functions of the L2 stack 203. Although the exact location of the network-specific ID is implementation specific, it is highly probable that this information will be in the in-package memory circuitry 113 since this information is relatively small and used throughout the L2 protocol stack. In this way, using the network-specific ID may provide better cache utilization, lower storage overhead, and lower processor utilization than the conventional RSS approach. The improved cache utilization and overhead reduction may lead to an overall reduction in power consumption of the system 200 and/or greater efficiency, especially in cases involving processing high priority/QoS tasks (e.g., video streaming).

Referring back to FIG. 2, at node 4 an interrupt request (IRQ) is issued in order to provide the packet 201 to the Rx queue 220 associated with the obtained core ID. An IRQ is a request for service sent at the hardware level. The IRQ may be sent by a dedicated hardware line or across an IX 106 as an information packet (e.g., a Message Signaled Interrupt (MSI) or MSI-X). Each Rx queue 220 may be associated with an individual IRQ based on a mapping of Rx queues 220 to IRQs. When the core ID is obtained at node 2, the baseband circuitry 114 may trigger an IRQ associated with the obtained core ID to notify the corresponding core 103 that the packet 201 is to arrive the associated Rx queue 220. In implementations where the IX 106 is a PCIe IX, an MSI-X may route each interrupt to a particular Rx queue 220. In other embodiments, a deferred procedure call (DPC) may be issued at node 4, where the baseband circuitry 114 (or a modem driver) issue a DPC request to the end of the Rx queue 220 of the obtained core ID, where the DPC request may have one of three priority levels: low, medium (default), or high. In these implementations, the data in the Rx queues 220 may be processed when an operating system of the host platform 105 drops to an interrupt request level (IRQL) of a Dispatch/DPC level until the Rx queue 220 is empty or some other interrupt with a higher IRQL occurs.

Figure 3:
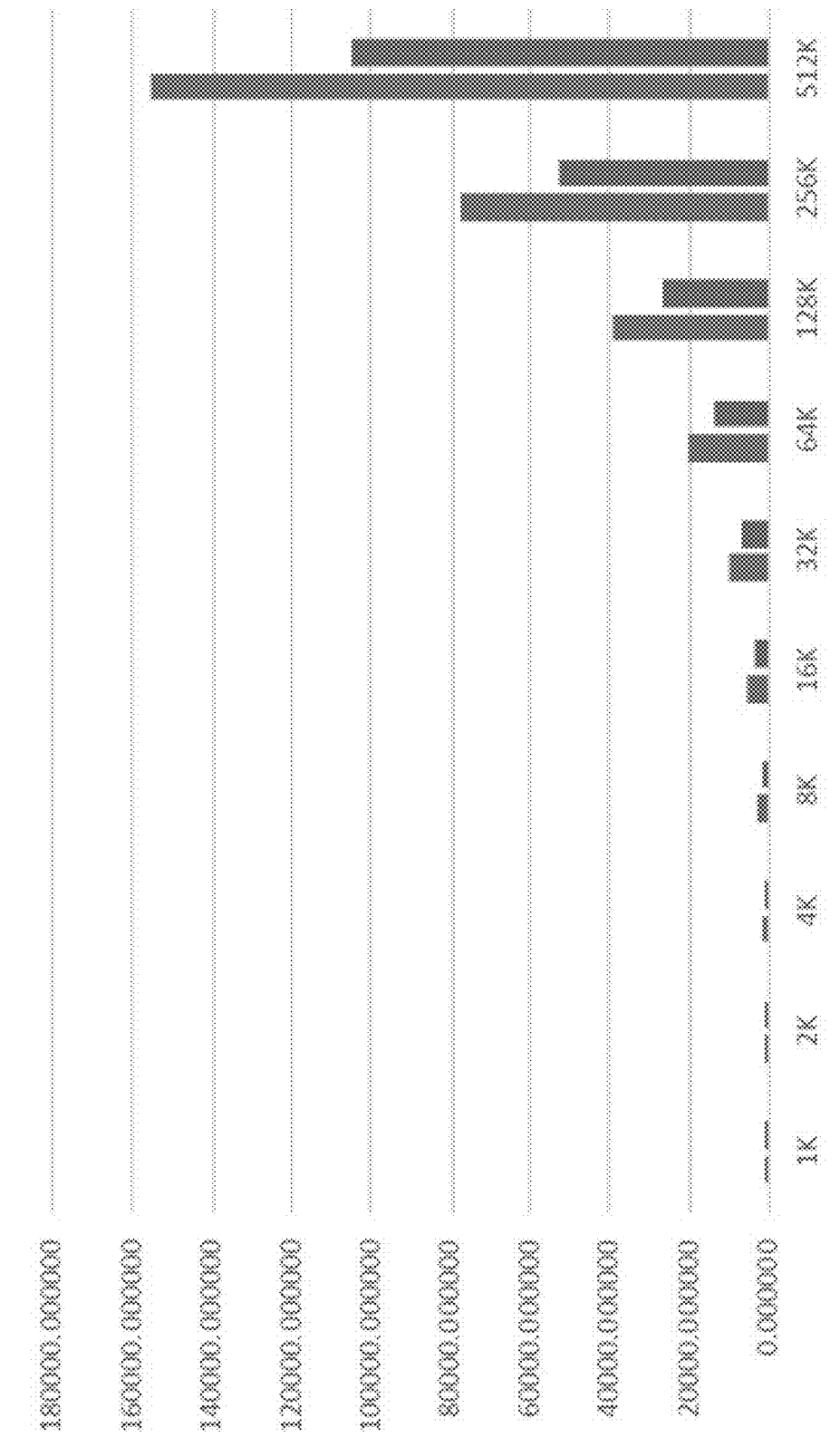
FIG. 3 shows a graph indicating the latencies in calculating a core identifier using the eRSS mechanisms discussed herein and a conventional approach to calculating a core identifier.

FIG. 3 shows graph 300 illustrating differences in latency for calculating a core ID using the conventional approach discussed previous and latency for calculating a core ID using the eRSS mechanisms discussed herein. The experiment used to produce the graph 300 were run on an ARM A53 processor on a Raspberry-Pi® platform running Linux®. In the experiment, a linked list of different numbers of IP packets were traversed. Additionally the IP packet size was set to 1500 bytes. The X-axis of graph 300 shows the number of IP packets traversed and the Y-axis of graph 300 shows the latency in microseconds (μs) for the CID computation using the existing IP-TCP header hash versus the eRSS mechanisms. In this experiment, an EPS bearer ID (EPS-ID) was used as the NSI.

As shown by graph 300, the EPS-ID approach offers lower latency in comparison to the IP flow based RSS approach, especially when processing a total of 512 kilobyte IP packets (where the downlink throughput would be approximately 6 Gigabits per second (Gbps) for a 1500 byte packet). The latency for traversing the IP packet list plus the CID computation for the IP-TCP header approach is approximately 160 milliseconds (ms) whereas the latency for traversing the IP packet list plus the CID computation for the eRSS approach (using the EPS-ID) is just over 100 ms.

In addition to the previously described experiment, table 1 shows the results of hash based latency using an Intel core i7 processor.

TABLE 1

| Iteration | Hash based latency (µs) | EPS-based latency (µs) |
|---|---|---|
| 1 | 61738 | 0 |
| 2 | 40454 | 1 |
| 3 | 50671 | 1 |

Figure 4:
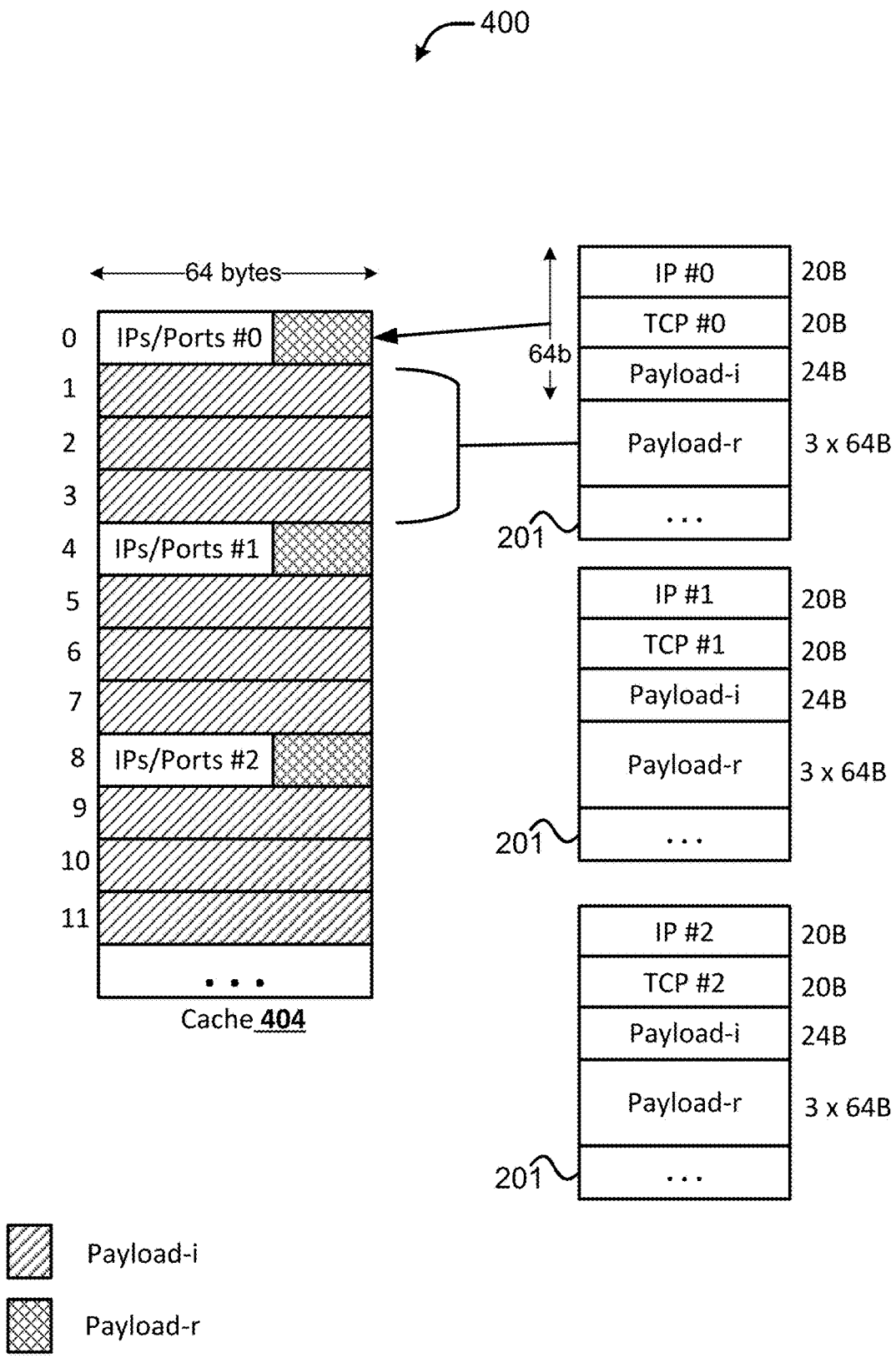
FIG. 4 shows an example cache utilization using a convention RSS mechanism.

FIG. 4 shows an example cache efficiency and utilization when using the conventional RSS mechanisms. FIG. 4 shows cache lines (labeled 0-11) of cache 404. In this example, the cache 404 may be on-chip memory circuitry of the modem circuitry 110 or baseband circuitry 114 discussed with regard to FIG. 1. In some implementations, the cache 404 may be static random access memory (SRAM) circuitry or some other suitable memory device/circuitry.

In the existing IP flow based RSS, in order to calculate the hash, the IP and TCP headers need to be brought in the cache 404. The minimum size of IP header and TCP header is about 40 bytes. Typically, processors (e.g., baseband circuitry 114) may use a pre-fetching mechanism ("pre-fetchers") to load additional cache lines from special locality addresses of the in-package memory circuitry 113 (e.g., DRAM) into the cache 404 in an effort to improve locality of reference. FIG. 4 shows the cache efficiency and utilization when the pre-fetcher brings in three additional cache lines into the cache 404 for three IP packets 201 (labeled IP #0, IP #1, and IP #2).

In this example, each cache line 0-11 may be 64 bytes (b) in length. In the IP flow based RSS approach, an entire cache line may be used to store the relevant information needed to calculate the hash (e.g., the IP source address, IP destination address, source port number, and destination port number). For example, FIG. 4 shows cache line 0 being populated with IP #0, TCP #0, and an initial payload ("payload-i"), and the next three cache lines 1-3 are loaded with the remaining payload ("payload-r"). In order to calculate the hash of a given IP packet 201 using the IP flow based RSS approach, a total number of 256 bytes (e.g., 64×4=256 bytes) per packet 201 are brought into the cache 404. These additional cache lines correspond to the remaining payload portion ("Payload-r") of the IP packets 201. This data is not used by any other component of the modem circuitry 110, and therefore, loading this data into the cache 404 may lead to cache pollution. Additionally, because the IP flow based RSS approach only uses the source IP address, destination IP address, source port, and destination port to calculate the hash, a total of 12 bytes (e.g., 4B+4B+2B+2B=12B) out of the 256 bytes are used, leading to a cache efficiency of approximately 4.7% for the each IP packet 201. Moreover, these 12 bytes are only used once in the lifetime of the IP packet 201 and are usually not used for other purposes, which may further decrease cache efficiency.

According to various embodiments, for every incoming (downlink) IP packet 201, the modem circuitry 110 may calculate or otherwise determine various L2 information such as a PDCP SN, PDCP hyper frame number (HFN), RLC SN, EPS-ID, among other L2 information when operating the L2 protocol stack 203. In some embodiments, the L2 information may be included in an L2 descriptor file, which may be loaded into the cache 404 for various radio control functions. The size or memory space required by the L2 information (or L2 descriptor file) may be very small in comparison to the amount of data loaded into the cache 404 in the IP flow based RSS approach as discussed previously. In addition, since the L2 information (or L2 descriptor file) is used throughout the different layers in the L2 protocol stack 203, the EPS-ID is likely to already be present in the cache 404 when the eRSS 202 fetches the EPS-ID for the hash calculation. This may reduce or eliminate main memory (e.g., in-package memory circuitry 113) accesses, and therefore, may reduce or eliminate cache pollution and/or the prefetching operations required for the IP flow based RSS approach. The cache efficiency in this case may be 100%.

In addition, the eRSS 202 may reduce the processor utilization for the hash calculation. The hash calculation for the IP flow based RSS typically requires using a Toplitz hash function. When operating at relatively high data rates (e.g., multi-gigabit data rates), using the Toplitz hash function may be computationally burdensome, which may result in increased computational overhead and may produce latency side effects including, but not limited to, packet drops. According to various embodiments, the Toplitz hash computation is eliminated, which may reduce the number of CPU cycles needed to calculate the hash, and therefore, may reduce computational overhead.

II. Example System Overview

Figure 5:
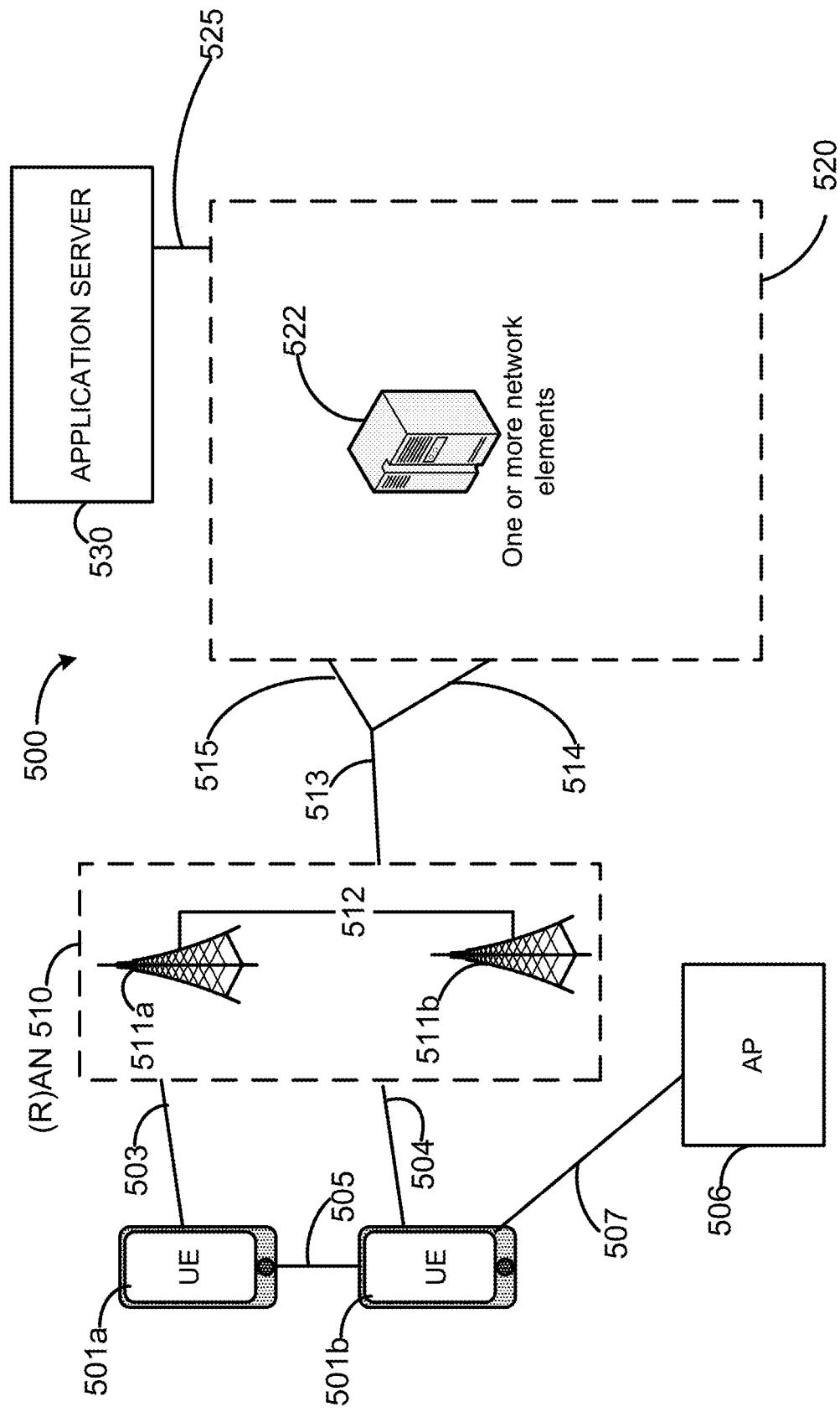
FIG. 5 illustrates an example architecture of a system of a network is shown, in accordance with various embodiments

FIG. 5 illustrates an example architecture of a system 500 of a network is shown, in accordance with various embodiments. The following description is provided for an example system 500 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (for example, Sixth Generation (6G)) systems, Institute of Electrical and Electronics Engineers (IEEE) 802.16 protocols (e.g., Wireless metropolitan area networks (MAN), Worldwide Interoperability for Microwave Access (Wi-MAX), etc.), or the like.

As shown by FIG. 5, the system 500 may include user equipment (UE) 501a and UE 501b (collectively referred to as "UEs 501" or "UE 501"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE)

devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like. According to various embodiments, the UEs 501 may implement the eRSS mechanisms discussed previously with regard to FIGS. 1-4, and the example eRSS procedure discussed with regard to FIG. 16 infra.

In some embodiments, any of the UEs 501 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 are configured to connect, for example, communicatively couple, with a access network (AN) or radio access network (RAN) 510. In embodiments, the RAN 510 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Spécial Mobile) EDGE (GSM Evolution) Radio Access Network). As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. As used herein, the term "radio access technology" or "RAT" refers to the technology used for the underlying physical connection to a radio based communication network, and the term "radio technology" as used herein refers to technology for wireless transmission and/or reception of electromagnetic radiation for information transfer.

In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. The term "communication protocol" (either wired or wireless) as used herein refers to a set of standardized rules or instructions implemented by a communication device and/or system to communicate with other devices and/or systems, including instructions for packetizing/depacketizing data, modulating/demodulating signals, implementation of protocols stacks, and/or the like. In embodiments, the UEs 501 a capable of directly exchanging communication data via a ProSe interface 505. The ProSe interface 505 may alternatively be referred to as a sidelink (SL) interface 505 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 501b is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 501b, RAN 510, and AP 506 are configured to utilize LTE-WLAN aggregation (LWA) operation and/or WLAN LTE/WLAN Radio Level Integration with IPsec Tunnel (LWIP) operation. The LWA operation may involve the UE 501b in RRC_CONNECTED being configured by a RAN node 511 to utilize radio resources of LTE and WLAN. LWIP operation may involve the UE 501b using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 511 that operates in an NR or 5G system 500 (for example a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 511 may be implemented as one or more software entities running on server computers as part of a virtual network, which may be referred to as a cloud radio access network (CRAN). In other embodiments, the RAN nodes 511 may represent individual gNB-distributed units (DUs) that are connected to a gNB-centralized unit (CU) via an 8 interface (not shown by FIG. 5).

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using Orthogonal Frequency-Division Multiplexing (OFDM) communication signals with each other or with any of the RAN nodes 511 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501. The physical downlink control channel (PDCCH) may carry information about the transport format and resource allocations related to the PDSCH channel, among other things. It may also inform the UEs 501 about the transport format, resource allocation, and H-ARQ (Hybrid Automatic Repeat Request) information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, Core Network (CN) 520. The CN 520 may comprise a plurality of network elements 522, which are configured to offer various data and telecommunications services to customers/subscribers (e.g., users of UEs 501) who are connected to the CN 520 via the RAN 510. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS Packet Services (PS) domain, LTE PS data services, etc.). The application server 530 can also be configured to support one or more communication services (e.g., Voice-over-Internet Protocol (VoIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling interface between the RAN nodes 511 and Access and Mobility Functions (AMFs). Embodiments where the CN 520 is a 5GC 520 are discussed in more detail with regard to FIG. 7.

In embodiments, the CN 520 may be a 5G CN (referred to as "5GC 520" or the like), while in other embodiments, the CN 520 may be an Evolved Packet Core (EPC)). Where CN 520 is an EPC (referred to as "EPC 520" or the like), the RAN 510 may be connected with the CN 520 via an S1 interface 513. In embodiments, the S1 interface 53 may be split into two parts, an S1 user plane (S1-U) interface 514, which carries traffic data between the RAN nodes 511 and the serving gateway (S-GW), and the S1-mobility management entity (MME) interface 515, which is a signaling interface between the RAN nodes 511 and MMEs. An example architecture wherein the CN 520 is an EPC 520 is shown by FIG. 6.

Figure 6:
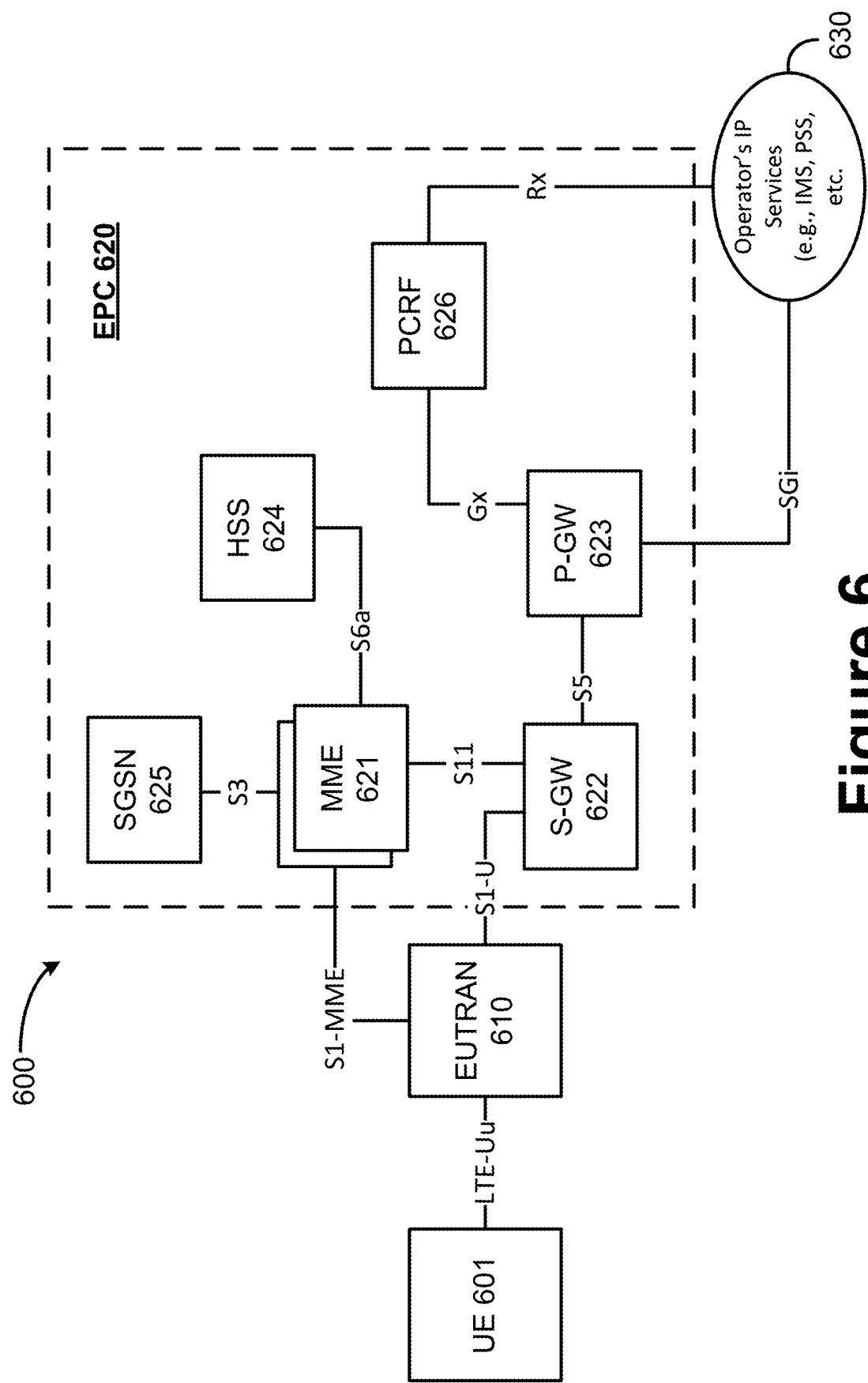
FIG. 6 illustrates an example architecture of a system including a first core network is shown, in accordance with various embodiments.

FIG. 6 illustrates an example architecture of a system 600 including a first CN 620 is shown, in accordance with various embodiments. In this example, system 600 may implement the LTE standard wherein the CN 620 is an EPC 620 that corresponds with CN 520 of FIG. 5. Additionally, the UE 601 may be the same or similar as the UEs 501 of FIG. 5, and the EUTRAN 610 may be a RAN that is the same or similar to the RAN 510 of FIG. 5, and which may include RAN nodes 511 discussed previously. The CN 620 may comprise MMEs 621, an S-GW 622, a Packet Data Network (PDN) Gateway (P-GW) 623, a home subscriber server (HSS) 624, and a Serving General Packet Radio Service (GPRS) Support Nodes (SGSN) 625.

The MMEs 621 may be similar in function to the control plane of legacy SGSN, and may implement mobility management (MM) functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S11 reference point.

The SGSN 625 may be a node that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HHS 624 and the MMEs 621 may enable transfer of subscription and authentication data for authenticating/authorizing user access to the EPC 620 between HHS 624 and the MMEs 621.

The S-GW 622 may terminate the S1 interface 513 ("S1-U" in FIG. 6) towards the RAN 610, and routes data packets between the RAN 610 and the EPC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMEs 621 may provide a control plane between the MMEs 621 and the S-GW 622. The S-GW 622 may be coupled with the P-GW 623 via an S5 reference point.

The P-GW 623 may terminate an SGi interface toward a Packet Data Network (PDN) 630. The P-GW 623 may route data packets between the EPC 620 and external networks such as a network including the application server 530 (alternatively referred to as application function (AF)) via an Internet Protocol (IP) interface 525 (see e.g., FIG. 5). In embodiments, the P-GW 623 may be communicatively coupled to an application server (application server 530 of FIG. 5 or PDN 630 in FIG. 6) via an IP communications interface 525 (see e.g., FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a node for policy enforcement and charging data collection (e.g., Policy and Charging Enforcement Function (PCEF) (not shown). Additionally, the SGi reference point between the P-GW 623 and the PDN 630 may be an operator external public, a private PDN, or an intra operator packet data network, for example, for provision of IMS services. The P-GW 623 may be coupled with a PCRF 626 via a Gx reference point.

Policy and Charging Enforcement Function (PCRF) 626 is the policy and charging control element of the EPC 620. In a non-roaming scenario, there may be a single PCRF 626 in the Home Public Land Mobile Network (HPLMN) associated with an UE's 601 Internet Protocol Connectivity Access Network (IP-CAN) session. In a roaming scenario with local breakout of traffic, there may be two PCRFs associated with an UE's 601 IP-CAN session, a Home PCRF (H-PCRF) within a HPLMN and a Visited PCRF (V-PCRF) within a Visited Public Land Mobile Network (VPLMN). The PCRF may be communicatively coupled to the application server 630 via the P-GW 623. The application server 630 may correspond to the application server 530 of FIG. 5.

The application server 630 may signal the PCRF to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630. The Gx reference point between the PCRF 626 and the P-GW 623 may allow for the transfer of (QoS) policy and charging rules from the PCRF 626 to Policy and Charging Enforcement Function (PCEF) in the P-GW 623. An Rx reference point may reside between the PDN 630 (or "AF 630") and the PCRF 626.

An IP connection between the UE 601 and the PDN 630 may be referred to as a PDN connection or an EPS session. Each PDN connection or EPS session is represented by an IP address of the UE 601 and a PDN ID (also referred to as an Access Point Name (APN)). The PDN connection may comprise one or more EPS bearers to deliver user traffic (e.g., IP packets), and a QoS policy obtained from the PCRF 626 may be applied to the EPS bearers. An EPS session may be a pipe through which flows of IP packets are communicated between the UE 601 and PDN 630 via the P-GW 623, and an EPS bearer is a pipe through which IP packets are delivered over the LTE network between the UE 601 and the P-GW 623 via the E-UTRAN 610 and the S-GW 622. An EPS bearer is a level of granularity for bearer level QoS control in the EPC 620 and the E-UTRAN 610. All traffic mapped to the same EPS bearer receive the same bearer level packet forwarding treatment (e.g., scheduling policy, queue management policy, rate shaping policy, RLC configuration, etc.). Providing different bearer level packet forwarding treatment requires separate EPS bearers.

Each EPS bearer is associated with an EPS bearer traffic flow template (TFT). The TFT is a set of packet filters associated with a corresponding EPS bearer. An uplink (UL) TFT is a set of UL packet filters in a TFT, which is used by the UE 601 to map uplink traffic to an EPS bearer (e.g., to be sent by the UE 601). A downlink (DL) TFT is a set of DL packet filters in a TFT used by the PCEF to map DL traffic to an the EPS bearer in the DL direction (e.g., to the UE 601). Each EPS bearer is associated with an EPS bearer identity (ID). An EPS bearer ID uniquely identifies an EPS bearer for one UE 601 accessing the network via the E-UTRAN 610. The EPS Bearer ID is allocated by the MME 621. When using an EPS Radio Bearer (RB), there is a one to one mapping between EPS RB and EPS Bearer, and the mapping between an EPS RB identity and the EPS Bearer ID is made by the E-UTRAN 610. The E-UTRAN Radio Access Bearer (E-RAB) ID value used at S1 and X2 interfaces to identify an E-RAB is the same as the EPS Bearer ID value used to identify the associated EPS Bearer.

Additionally, an EPS bearer is a combination of three bearers: a data radio bearer (DRB), an S1 bearer, and an S5 bearer. A DRB is established between the UE 601 and the E-UTRAN 610 (or an eNB) over the LTE Uu interface. A DRB is a tunnel through which IP packets are conveyed between the UE 601 and the E-UTRAN 610 (or eNB) and may be identified by a DRB ID, which is allocated by the E-UTRAN 610 (or an eNB). The S1 bearer is a bearer established over S1-U interface between the E-UTRAN 610 (or eNB) and the S-GW 622. The IP packets are communicated through a GTP tunnel, and may be identified by their tunnel endpoint identifier (TEID), which is allocated by the E-UTRAN 610 (or eNB) and/or the S-GW 622. The S5 bearer is a bearer established over S5 interface between the S-GW 622 and the P-GW 623. The IP packets are communicated through another GTP tunnel, and may be identified by the same or different TEID that is allocated by the P-GW 623 and/or the S-GW 622. According to various embodiments, the eRSS 202 may utilize any of the aforementioned EPS identifiers for routing data packets to individual processor cores 103 of processor circuitry 102 as discussed previously with respect to FIGS. 1-2. In these embodiments, the aforementioned network-specific identifier or the session identifier may be one (or a combination) of a PDN ID, an EPS bearer ID, a DRB ID, a TEID for a GTP tunnel over the S1-U interface, a TEID for a GTP tunnel over the S5 interface, a Packet Data Network (PDN) ID, an Access Point Name (APN), or a Quality of Service (QoS) Class Identifier (QCI), and/or some other EPS related identifier or parameter.

Figure 7:
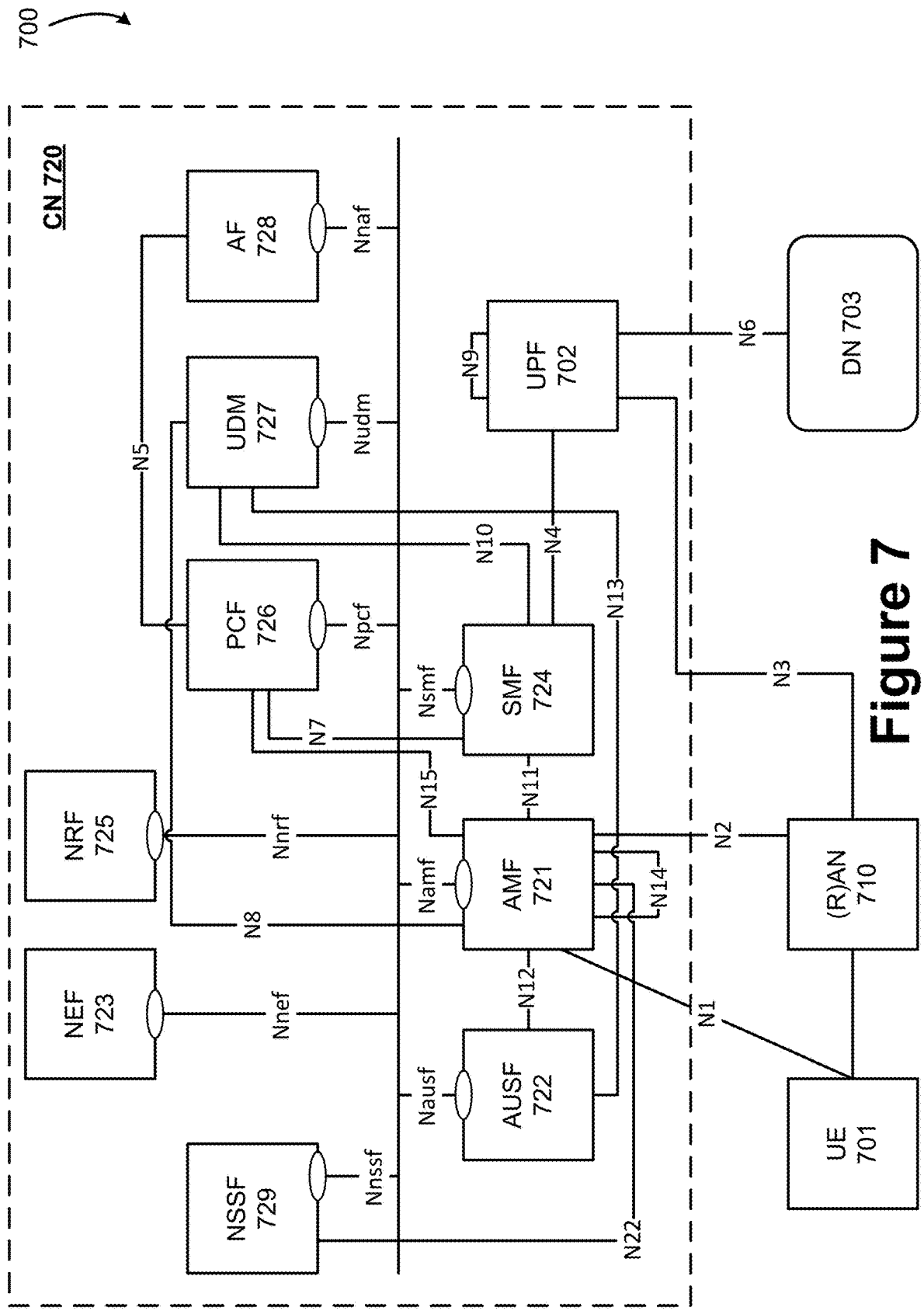
FIG. 7 illustrates an architecture of a system including a second core network is shown in accordance with various embodiments.

FIG. 7 illustrates an architecture of a system 700 including a second CN 720 is shown in accordance with various embodiments. The system 700 is shown to include a UE 701, which may be the same or similar to the UEs 501 and UE 601 discussed previously (having eRSS technology described herein); a (R)AN 710, which may be the same or similar to the RAN 510 and RAN 610 discussed previously, and which may include RAN nodes 511 discussed previously; and a Data network (DN) 703, which may be, for example, operator services, Internet access or 3rd party services; and a 5G Core Network (5GC or CN) 720.

The 5GC 720 includes an Authentication Server Function (AUSF) 222; an Access and Mobility Management Function (AMF) 721; a Session Management Function (SMF) 724; a Network Exposure Function (NEF) 723; a Policy Control function (PCF) 726; a Network Function (NF) Repository Function (NRF) 725; a Unified Data Management (UDM) 727; an Application Function (AF) 728; a User Plane Function (UPF) 702; and a Network Slice Selection Function (NSSF) 729.

The UPF 702 acts as an anchor point for intra-RAT and inter-RAT mobility, an external PDU session point of interconnect to DN 703, and a branching point to support multi-homed PDU session. The UPF 702 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. DN 703 may include, or be similar to application server 530 discussed previously. The UPF 702 may interact with the SMF 724 via an N4 reference point between the SMF 724 and the UPF 702.

The AUSF 722 is capable of storing data for authentication of UE 701 and handle authentication related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 is responsible for registration management (e.g., for registering UE 701, etc.), connection management, reachability management, mobility management, and lawful interception of AMF-related events, and access authentication and authorization. The AMF 721 may be a termination point for the an N11 reference point between the AMF 721 and the SMF 724. The AMF 721 may provide transport for Session Management (SM) messages between the UE 701 and the SMF 724, and act as a transparent proxy for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface, which may include or be an N2 reference point between the (R)AN 711 and the AMF 721; and the AMF 721 may be a termination point of NAS (N1) signalling, and perform NAS ciphering and integrity protection.

AMF 721 also supports NAS signalling with a UE 701 over an N3 interworking-function (IWF) interface. The N3IWF may be used to provide access to untrusted entities. N3IWF may be a termination point for the N2 interface between the (R)AN 710 and the AMF 721 for the control plane, and may be a termination point for the N3 reference point between the (R)AN 710 and the UPF 702 for the user plane. As such, the AMF 721 may handle N2 signalling from the SMF 724 and the AMF 721 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-Equipment Identity Register (5G-EIR) (not shown by FIG. 7).

The UE 701 may need to register with the AMF 721 in order to receive network services. Registration Management (RM) is used to register or deregister the UE 701 with the network (e.g., AMF 721), and establish a UE context in the network (e.g., AMF 721). The UE 701 may operate in an RM-REGISTERED state or an RM-DEREGISTERED state. In the RM-DEREGISTERED state, the UE 701 is not registered with the network, and the UE context in AMF 721 holds no valid location or routing information for the UE 701 so the UE 701 is not reachable by the AMF 721. In the RM-REGISTERED state, the UE 701 is registered with the network, and the UE context in AMF 721 may hold a valid location or routing information for the UE 701 so the UE 701 is reachable by the AMF 721. In the RM-REGISTERED state, the UE 701 may perform mobility Registration Update procedures, perform periodic Registration Update procedure triggered by expiration of the periodic update timer (e.g., to notify the network that the UE 701 is still active), and perform a Registration Update procedure to update UE capability information or to re-negotiate protocol parameters with the network, among others.

The AMF 721 is capable of storing one or more RM contexts for the UE 701, where each RM context is associated with a specific access to the network. The RM context may be a data structure, database object, etc. that indicates or stores, inter alia, a registration state per access type and the periodic update timer. The AMF 721 may also store a 5GC MM context that may be the same or similar to the (E)MM context discussed previously. In various embodiments, the AMF 721 may store a CE mode B Restriction parameter of the UE 701 in an associated MM context or RM context. The AMF 721 may also derive the value, when needed, from the UE's usage setting parameter already stored in the UE context (and/or MM/RM Context).

Connection Management (CM) is used to establish and release a signaling connection between the UE 701 and the AMF 721 over the N1 interface. The signaling connection is used to enable NAS signaling exchange between the UE 701 and the CN 720, and comprises both the AN signaling connection between the UE and the Access Network (AN) (e.g., RRC connection or UE-N3IWF connection for Non-3GPP access) and the N2 connection for the UE 701 between the AN (e.g., RAN 710) and the AMF 721. The UE 701 may operate in one of two CM states, CM-IDLE mode or CM-CONNECTED mode. When the UE 701 is operating in the CM-IDLE state/mode, the UE 701 may have no NAS signaling connection established with the AMF 721 over the N1 interface, and there may be (R)AN 710 signaling connection (e.g., N2 and/or N3 connections) for the UE 701. When the UE 701 is operating in the CM-CONNECTED state/mode, the UE 701 may have an established NAS signaling connection with the AMF 721 over the N1 interface, and there may be a (R)AN 710 signaling connection (e.g., N2 and/or N3 connections) for the UE 701. Establishment of an N2 connection between the (R)AN 710 and the AMF 721 may cause the UE 701 to transition from CM-IDLE mode to CM-CONNECTED mode, and the UE 701 may transition from the CM-CONNECTED mode to the CM-IDLE mode when N2 signaling between the (R)AN 710 and the AMF 721 is released.

The SMF 724 is responsible for Session Management (SM) (e.g., session establishment, modify and release, including tunnel maintain between UPF and AN node); UE IP address allocation & management (including optional Authorization); selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. SM may refer to management of a PDU session, and a PDU session or "session" may refer to a PDU Connectivity Service that provides or enables the exchange of PDUs between a UE 701 and a data network (DN) 703 identified by a Data Network Name (DNN). PDU Sessions may be established upon UE 701 request, modified upon UE 701 and 5GC 720 request, and released upon UE 701 and 5GC 720 request using NAS SM signaling exchanged over the N1 reference point between the UE 701 and the SMF 724. Upon request from an Application Server, the 5GC 720 may trigger a specific application in the UE 701. In response to receipt of the trigger message, the UE 701 may pass the trigger message (or relevant parts/information of the trigger message) to one or more identified applications in the UE 701. The identified application(s) in the UE 701 may establish a PDU Session to a specific DNN. The SMF 724 may check whether the UE 701 requests are compliant with user subscription information associated with the UE 701. In this regard, the SMF 724 may retrieve and/or request to receive update notifications on SMF 724 level subscription data from the UDM 727.

The SMF 724 controls a Quality of Service (QoS) model. The QoS model supports QoS flows that may require a guaranteed flow bit rate (also referred to as guaranteed bit rate (GBR) QoS Flows) and QoS flows that do not require a flow GBR (also referred to as Non-GBR QoS Flows). The 5G QoS model also supports Reflective QoS.

A QoS Flow is the finest granularity of QoS differentiation in the Packet Data Unit (PDU) Session. A QoS Flow Identifier (QFI) is used to identify a QoS Flow in the 5GS. User Plane traffic with the same QFI within a PDU Session may receive the same traffic forwarding treatment (e.g. scheduling, admission threshold). The QFI is carried in an encapsulation header on N3 (and N9) without any changes to the end-to-end (e2e) packet header. The QFI may be used for all PDU Session Types, and may be unique within a PDU Session. The QFI may be dynamically assigned or may be equal to a 5G QoS Identifier (5QI). The 5QI is a scalar that is used as a reference to 5G QoS characteristics (e.g., access node-specific parameters) that control QoS forwarding treatment for the QoS Flow (e.g., scheduling weights, admission thresholds, queue management thresholds, link layer protocol configuration, etc.).

Within the 5GS, a QoS Flow is controlled by the SMF 724 and may be preconfigured, or established via a PDU Session Establishment procedure or a PDU Session Modification procedure. Each QoS Flow may comprise or be associated with a QoS profile, one or more QoS rules, and one or more QoS uplink (UL) and downlink (DL) Packet Detection Rule(s) (PDR(s)).

The QoS profile of a QoS Flow may comprise various QoS parameters, and may be provided by the SMF to an AN via the AMF over the N2 reference point or preconfigured in the AN. For example, each QoS profile may include a 5G QoS Identifier (5QI) and an Allocation and Retention Priority (ARP). The ARP is a QoS parameter that includes information about the priority level, the pre-emption capability, and the pre-emption vulnerability. The priority level defines the relative importance of a resource request, which may allow for decisions as to whether a new QoS flow may be accepted or needs to be rejected in the case of resource limitations (e.g., typically used for admission control of GBR traffic). It may also be used to decide which existing QoS Flow to pre-empt during resource limitations. In these embodiments, the aforementioned network-specific identifier (NSI) or the session identifier may be one (or a combination) of an QFI, 5QI, and/or some other QoS Flow related parameter or identifier.

The SMF 724 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using a standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF Discovery Requests from NF instances, and provide the information of the discovered NF instances to the NF instances. NRF 725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behaviour. The PCF 726 may also implement a front end (FE) to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF 721 (not shown by FIG. 7). The UDM 727 may include two parts, an application FE and a User Data Repository (UDR) (the FE and UDR are not shown by FIG. 7). The UDR may store subscription data and policy data for the UDM 727 and the PCF 726, and/or structured data for exposure and application data (including Packet Flow Descriptions (PFDs) for application detection, application request information for multiple UEs 201) for the NEF 723. The Nudr service-based interface may be exhibited by the UDR 221 to allow the UDM 727, PCF 726, and NEF 723 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, access to the Network Capability Exposure (NCE), and interact with the policy framework for policy control. The NCE may be a mechanism that allows the 5GC 720 and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed Network Slice Selection Assistance Information (NSSAI) and the mapping to the Subscribed Single-NSSAIs (S-NSSAIs), if needed. The NSSF 729 may also determine the AMF set to be used to serve the UE 701, or a list of candidate AMF(s) 221 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The CN 720 may also include other elements that are not shown by FIG. 7, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 8 and 9.

Figure 8:
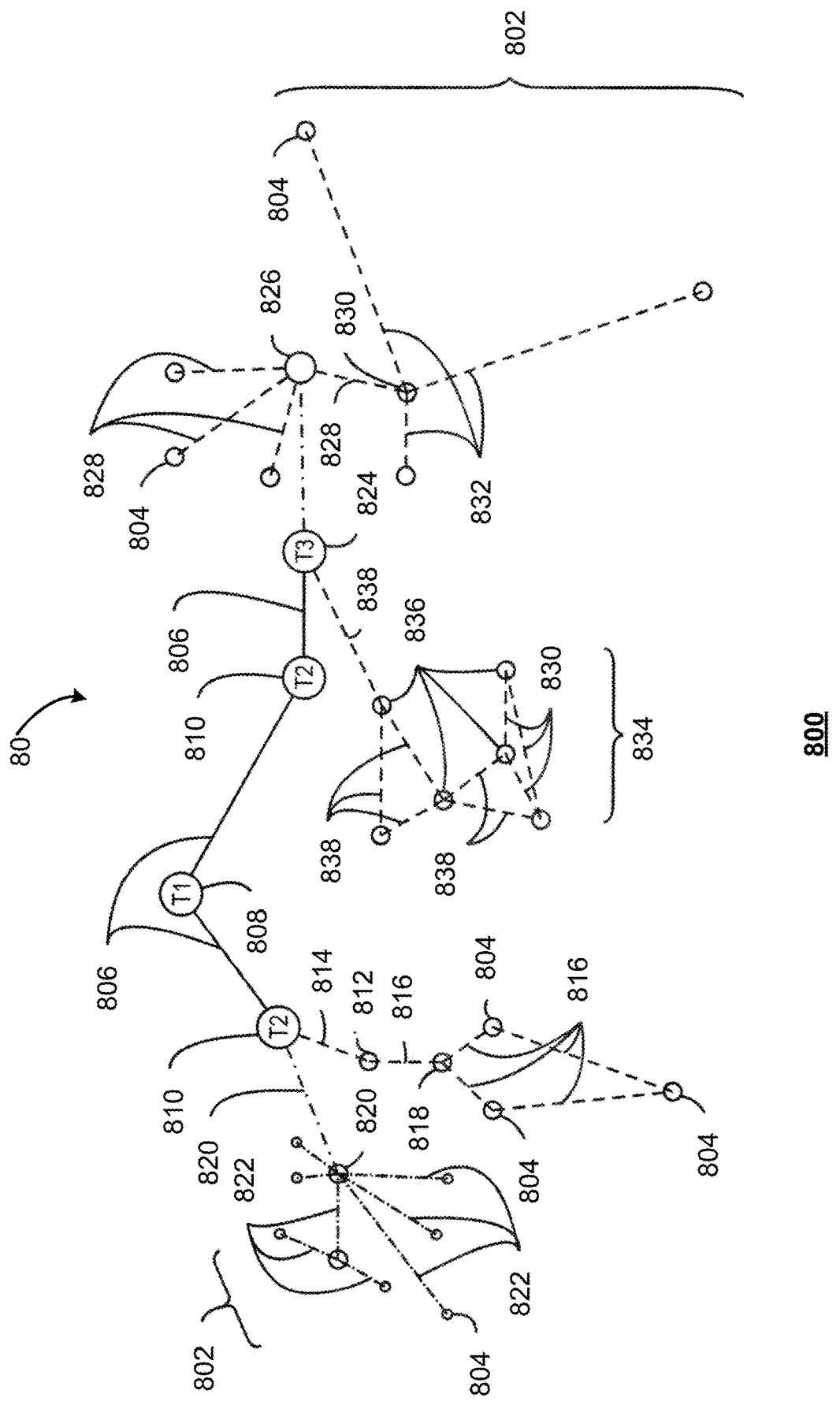
FIG. 8 illustrates an arrangement showing interconnections that may be present between a network and Internet of Things (IoT) networks, in accordance with various embodiments.
Figure 9:
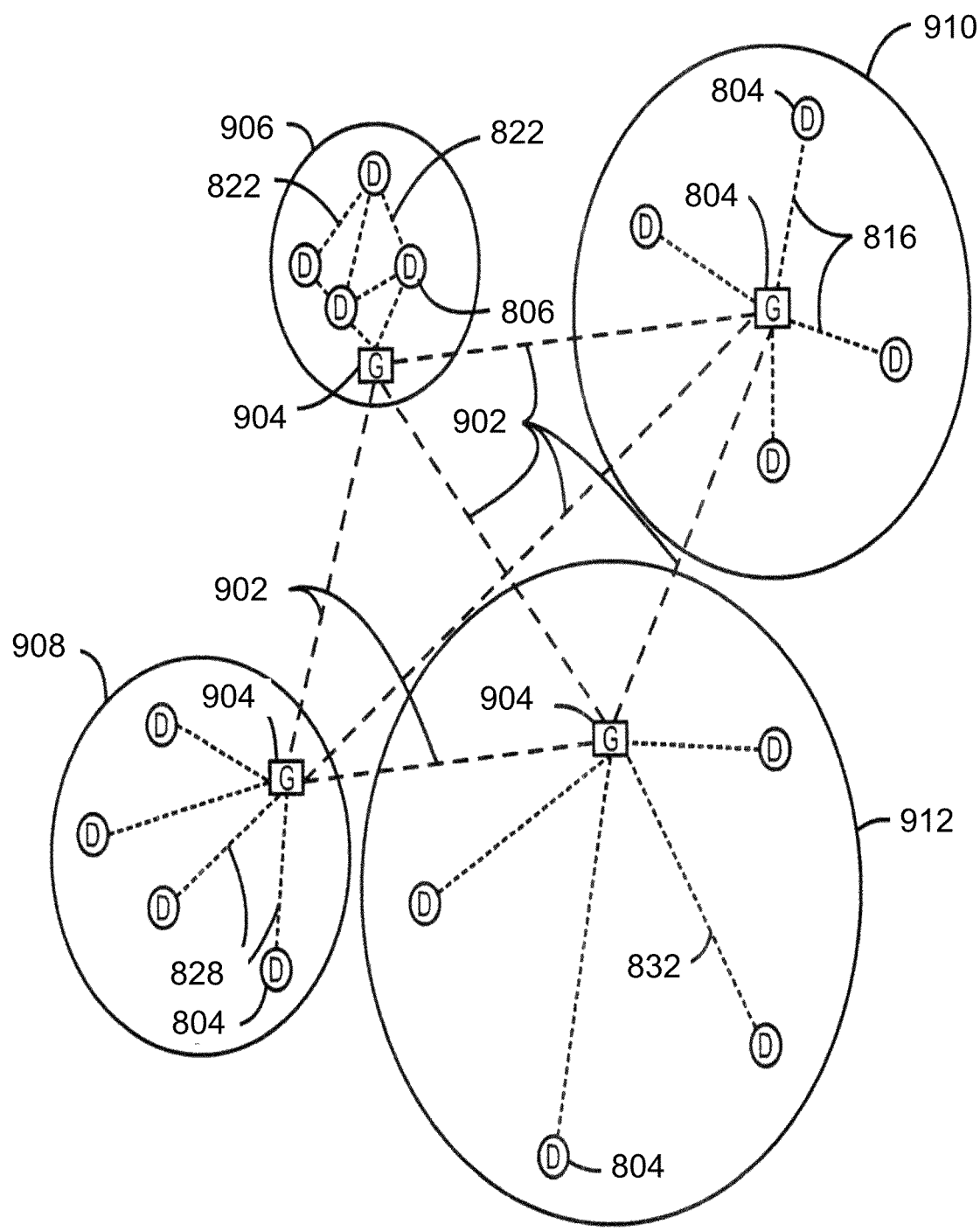
FIG. 9 illustrates an example domain topology, in accordance with various embodiments.

FIG. 8 illustrates an arrangement 80 showing interconnections that may be present between the Internet 800 and IoT networks, in accordance with various embodiments. The interconnections may couple smaller networks 802, down to the individual IoT device 804, to the fiber backbone 806 of the Internet 800. To simplify the drawing, not every device 804, or other object, is labeled. According to various embodiments, the IoT devices 804 is to implement the eRSS mechanisms discussed with regard to FIGS. 1-4 and 16.

In FIG. 8, top-level providers, which may be termed tier 1 providers 808, are coupled by the fiber backbone of the Internet to other providers, such as secondary or tier 2 providers 810. In one example, a tier 2 provider 810 may couple to a tower 812 of an LTE or NR cellular network, for example, by further fiber links, by microwave communications 814, or by other communications technologies. In some embodiments, tower 812 may correspond to RAN nodes 511 discussed previously. The tower 812 may couple to a mesh network including IoT devices 804 through an LTE communication link 816, for example, through a central node 818. The communications between the individual IoT devices 804 may also be based on LTE communication links 816. In another example, a high-speed uplink 820 may couple a tier 2 provider 810 to a gateway (GW) 820. A number of IoT devices 804 may communicate with the GW 820, and with each other through the GW 820, for example, over BLE links 822.

The fiber backbone 806 may couple lower levels of service providers to the Internet, such as tier 3 providers 824. A tier 3 provider 824 may be considered a general Internet service provider (ISP), for example, purchasing access to the fiber backbone 810 from a tier 2 provider 810 and providing access to a corporate GW 826 and other customers. From the corporate GW 826, a wireless local area network (WLAN) can be used to communicate with IoT devices 804 through Wi-Fi® links 828. A Wi-Fi link 828 may also be used to couple to a low power wide area (LPWA) GW 830, which can communicate with IoT devices 804 over LPWA links 832, for example, compatible with the LoRaWan specification promulgated by the LoRa alliance.

The tier 3 provider 824 may also provide access to a mesh network 834 through a coordinator device 836 that communicates with the tier 3 provider 824 using any number of communications links, such as an LTE cellular link, an LPWA link, or a link 838 based on the IEEE 802.15.4 standard, such as Zigbee®. Other coordinator devices 836 may provide a chain of links that forms cluster tree of linked devices.

IoT devices 804 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 804 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 804 may be biotic devices such as monitoring implants, biosensors, biochips, and the like. In other embodiments, an IoT device 804 may be a computer device that is embedded in a computer system and coupled with communications circuitry of the computer system. In such embodiments, the IoT device 804 may be a system on chip (SoC), a universal integrated circuitry card (UICC), an embedded UICC (eUICC), and the like, and the computer system may be a mobile station (e.g., a smartphone) or user equipment (e.g., UE 501, 601, or 701), laptop PC, wearable device (e.g., a smart watch, fitness tracker, etc.), "smart" appliance (e.g., a television, refrigerator, a security system, etc.), and the like. In embodiments, the IoT devices 804 correspond to the system 200 and/or the UEs 501, 601, 701 discussed previously.

Each of the IoT devices 804 may include one or more memory devices and one or more processors to capture and store/record data. Each of the IoT devices 804 may include appropriate communications circuitry (e.g., transceiver(s), modem, antenna elements, etc.) to communicate (e.g., transmit and receive) captured and stored/recorded data. Further, each IoT device 804 may include other transceivers for communications using additional protocols and frequencies. The wireless communications protocols may be any suitable set of standardized rules or instructions implemented by the IoT devices 804 to communicate with other devices, including instructions for packetizing/depacketizing data, instructions for modulating/demodulating signals, instructions for implementation of protocols stacks, and the like. For example, IoT devices 804 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 812, GW 820, 826, and 830, coordinator device 836, and so forth, may also be incorporated with the embodiments described herein, in particular, with references to FIGS. 1-6.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 9 illustrates an example domain topology 200 that may be used for a number of IoT networks coupled through backbone links 902 to GWs 904, in accordance with various embodiments. Like numbered items are as described with respect to FIG. 8. Further, to simplify the drawing, not every device 804, or communications link 816, 822, 828, or 832 is labeled. The backbone links 902 may include any number of wired or wireless technologies, and may be part of a local area network (LAN), a wide area network (WAN), or the Internet. Similar to FIG. 8, in embodiments, one or more of IoT devices 804, GW 804, and so forth, may be incorporated with the eRSS embodiments described herein, in particular, with references to FIGS. 1-6 and 16.

The network topology 900 may include any number of types of IoT networks, such as a mesh network 906 using BLE links 822. Other IoT networks that may be present include a WLAN network 908, a cellular network 210, and an LPWA network 912. Each of these IoT networks may provide opportunities for new developments, as described herein. For example, communications between IoT devices 804, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 906 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 908 may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 910 may be enhanced by systems that offload data, extend communications to more remote devices, or both. The LPWA network 912 may include systems that perform non-Internet protocol (IP) to IP interconnections, addressing, and routing.

Figure 10:
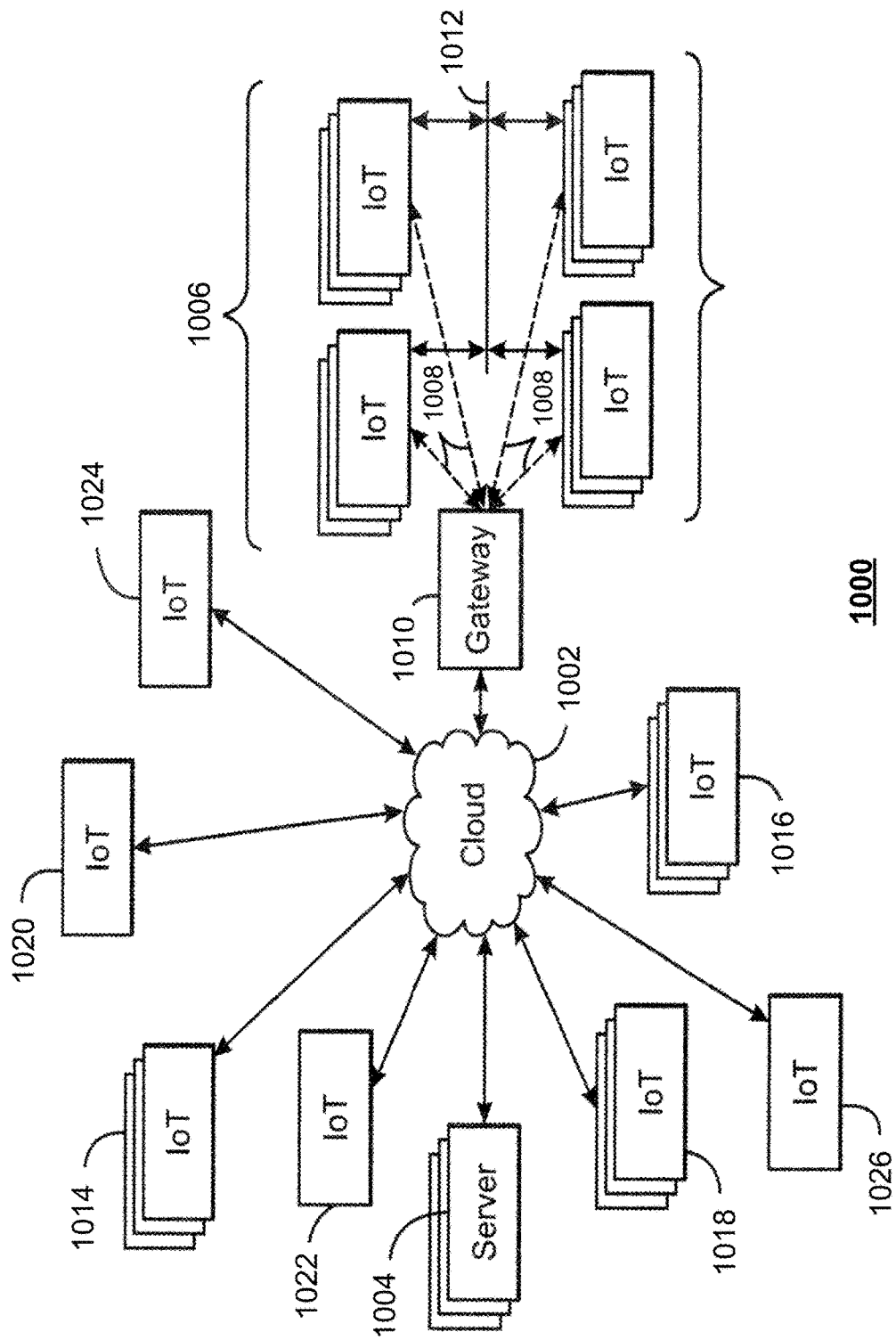
FIG. 10 illustrates an example cloud computing network or cloud in communication with a number of IoT devices, in accordance with various embodiments.

FIG. 10 illustrates an example cloud computing network, or cloud 1002, in communication with a number of Internet of Things (IoT) devices, in accordance with various embodiments. The cloud 1002 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 1002 may be associated with network operator who owns or controls equipment and other elements necessary to provide network-related services, such as one or more base stations or access points, and one or more servers for routing digital data or telephone calls (for example, a core network or backbone network).

The IoT devices in FIG. 10 may be the same or similar to the IoT devices 804 discussed with regard to FIGS. 8-9 (with eRSS technology described herein). The IoT devices may include any number of different types of devices, grouped in various combinations, such as IoT group 1006 that may include IoT devices that provide one or more services for a particular user, customer, organizations, etc. A service provider may deploy the IoT devices in the IoT group 1006 to a particular area (e.g., a geolocation, building, etc.) in order to provide the one or more services. In one example, the IoT group 1006 may be a traffic control group where the IoT devices in the IoT group 1006 may include stoplights, traffic flow monitors, cameras, weather sensors, and the like, to provide traffic control and traffic analytics services for a particular municipality or other like entity. Similar to FIGS. 8-9, in embodiments, one or more of IoT devices 1014-1024, GW 1010, and so forth, may be incorporated with the various embodiments described herein, in particular, with references to FIGS. 1-6 and 16. For example, in some embodiments, the IoT group 1006, or any of the IoT groups discussed herein, may include the UEs 501, system 200, and/or some other device.

The IoT group 1006, or other subgroups, may be in communication with the cloud 1002 through wireless links 1008, such as LPWA links, and the like. Further, a wired or wireless sub-network 1012 may allow the IoT devices to communicate with each other, such as through a local area network, a wireless local area network, and the like. The IoT devices may use another device, such as a GW 1010 to communicate with the cloud 1002. Other groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, or both.

As can be seen from FIG. 10, a large number of IoT devices may be communicating through the cloud 1002. This may allow different IoT devices to request or provide information to other devices autonomously. For example, the IoT group 1006 may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

In another example, the IoT group 1006 may be an industrial control group (also referred to as a "connected factory", an "industry 4.0" group, and the like) where the IoT devices in the IoT group 1006 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1006 may communicate with the servers 1004 via GW 1010 and cloud 1002 to provide captured data, which may be used to provide performance monitoring and analytics to the manufacturer or factory operator. Additionally, the IoT devices in the IoT group 1006 may communicate among each other, and/or with other IoT devices of other IoT groups, to make decisions on their own and to perform their tasks as autonomously as possible.

Clusters of IoT devices, such as the IoT groups depicted by FIG. 10, may be equipped to communicate with other IoT devices as well as with the cloud 1002. This may allow the IoT devices to form an ad-hoc network between the devices, allowing them to function as a single device, which may be termed a fog device. This is discussed further with respect to FIG. 11.

Figure 11:
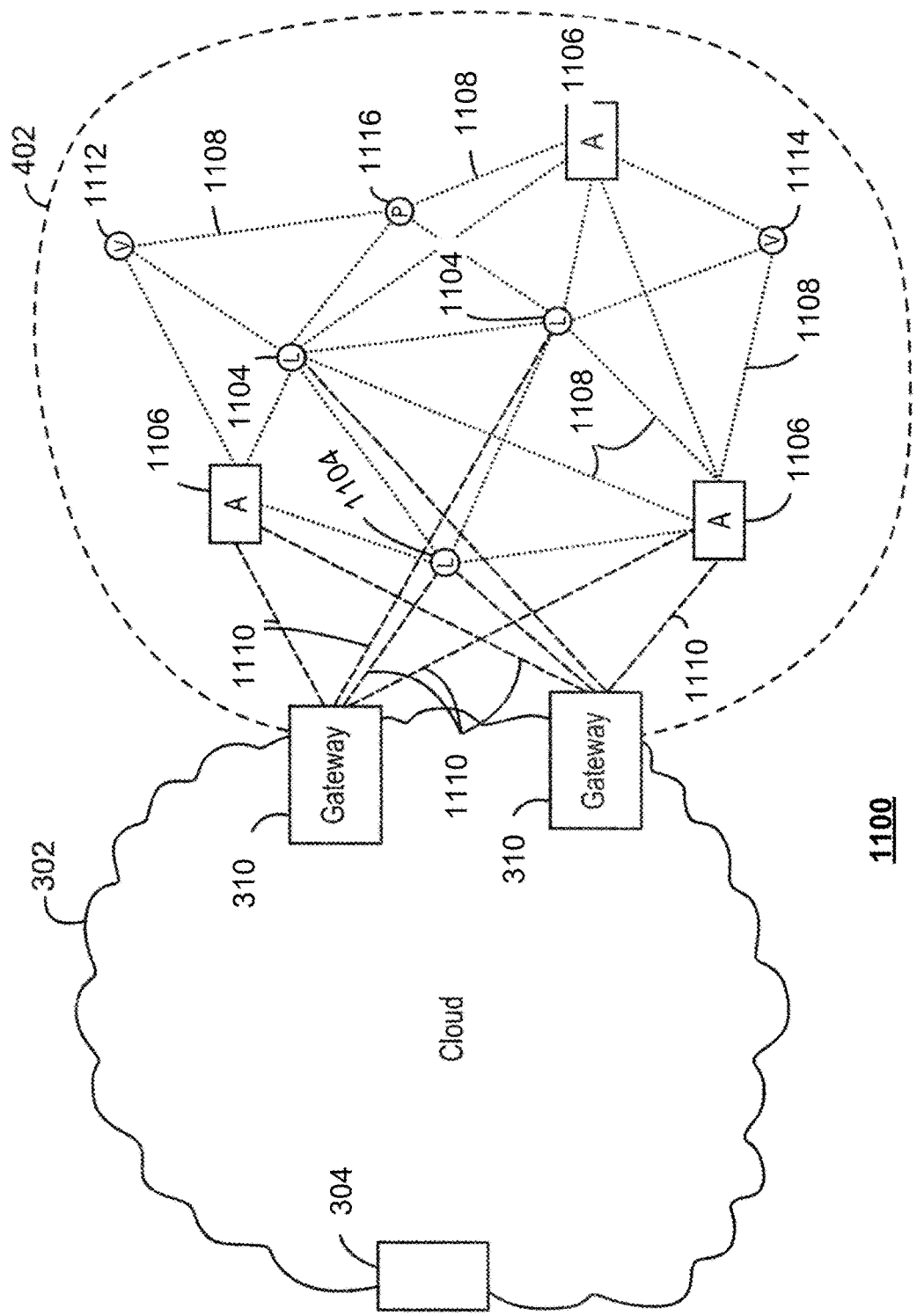
FIG. 11 illustrates an arrangement of a cloud computing network or cloud in communication with a mesh network of IoT devices or IoT fog, in accordance with various embodiments.

FIG. 11 illustrates an arrangement 1100 of a cloud computing network, or cloud 1002, in communication with a mesh network of IoT devices, which may be termed a fog device 1102, operating at the edge of the cloud 1002, in accordance with various embodiments. Like numbered items are as described with respect to FIGS. 8-10. In this example, the fog device 1102 is a group of IoT devices at an intersection. The fog device 402 may be established in accordance with specifications released by the OpenFog Consortium (OFC), the Open Connectivity Foundation™ (OCF), among others.

Data may be captured, stored/recorded, and communicated among the IoT devices 1104. Analysis of the traffic flow and control schemes may be implemented by aggregators 1106 that are in communication with the IoT devices 1104 and each other through a mesh network. Data may be uploaded to the cloud 1002, and commands received from the cloud 1002, through GWs 1010 that are in communication with the IoT devices 404 and the aggregators 1106 through the mesh network. Similar to FIGS. 8-10, in embodiments, one or more of IoT devices 1104, aggregators 1106, and so forth, may be incorporated with the various embodiments described herein (having eRSS technology), in particular, with references to FIGS. 1-7. For example, in some embodiments, the fog device 1102, or any of grouping of devices discussed herein, may include the UEs 501 or system 200.

Any number of communications links may be used in the fog device 1102. Shorter-range links 1108, for example, compatible with IEEE 802.15.4 may provide local communications between IoT devices that are proximate to one another or other devices. Longer-range links 1110, for example, compatible with LPWA standards, may provide communications between the IoT devices and the GWs 1010. To simplify the diagram, not every communications link 1108 or 1110 is labeled with a reference number.

The fog device 1102 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1010. In these networks, the number of interconnections may provide substantial redundancy, allowing communications to be maintained, even with the loss of a number of IoT devices.

Not all of the IoT devices may be permanent members of the fog device 1102. In the example in the drawing 1100, three transient IoT devices have joined the fog device 1102, a first mobile device 1112, a second mobile device 1114, and a third mobile device 416. The fog device 1102 may be presented to clients in the cloud 1002, such as the server 304, as a single device located at the edge of the cloud 1002. In this example, the control communications to specific resources in the fog device 1102 may occur without identifying any specific IoT device 1104 within the fog device 1102. Accordingly, if any IoT device 1104 fails, other IoT devices 1104 may be able to discover and control a resource. For example, the IoT devices 404 may be wired so as to allow any one of the IoT devices 1104 to control measurements, inputs, outputs, etc., for the other IoT devices 1104. The aggregators 1106 may also provide redundancy in the control of the IoT devices 1104 and other functions of the fog device 1102.

In some examples, the IoT devices may be configured using an imperative programming style, e.g., with each IoT device having a specific function and communication partners. However, the IoT devices forming the fog device 1102 may be configured in a declarative programming style, allowing the IoT devices to reconfigure their operations and communications, such as to determine needed resources in response to conditions, queries, and device failures. This may be performed as transient IoT devices, such as the devices 1112, 1114, 1116, join the fog device 1102. As transient or mobile IoT devices enter or leave the fog 1102, the fog device 1102 may reconfigure itself to include those devices. This may be performed by forming a temporary group of the devices 1112 and 1114 and the third mobile device 1116 to control or otherwise communicate with the IoT devices 404. If one or both of the devices 1112, 1114 are autonomous, the temporary group may provide instructions to the devices 1112, 1114. As the transient devices 1112, 1114, and 1116, leave the vicinity of the fog device 1102, it may reconfigure itself to eliminate those IoT devices from the network. The fog device 1102 may also divide itself into functional units, such as the IoT devices 1104 and other IoT devices proximate to a particular area or geographic feature, or other IoT devices that perform a particular function. This type of combination may enable the formation of larger IoT constructs using resources from the fog device 402.

As illustrated by the fog device 1102, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

III. Example Implementations

Figure 12:
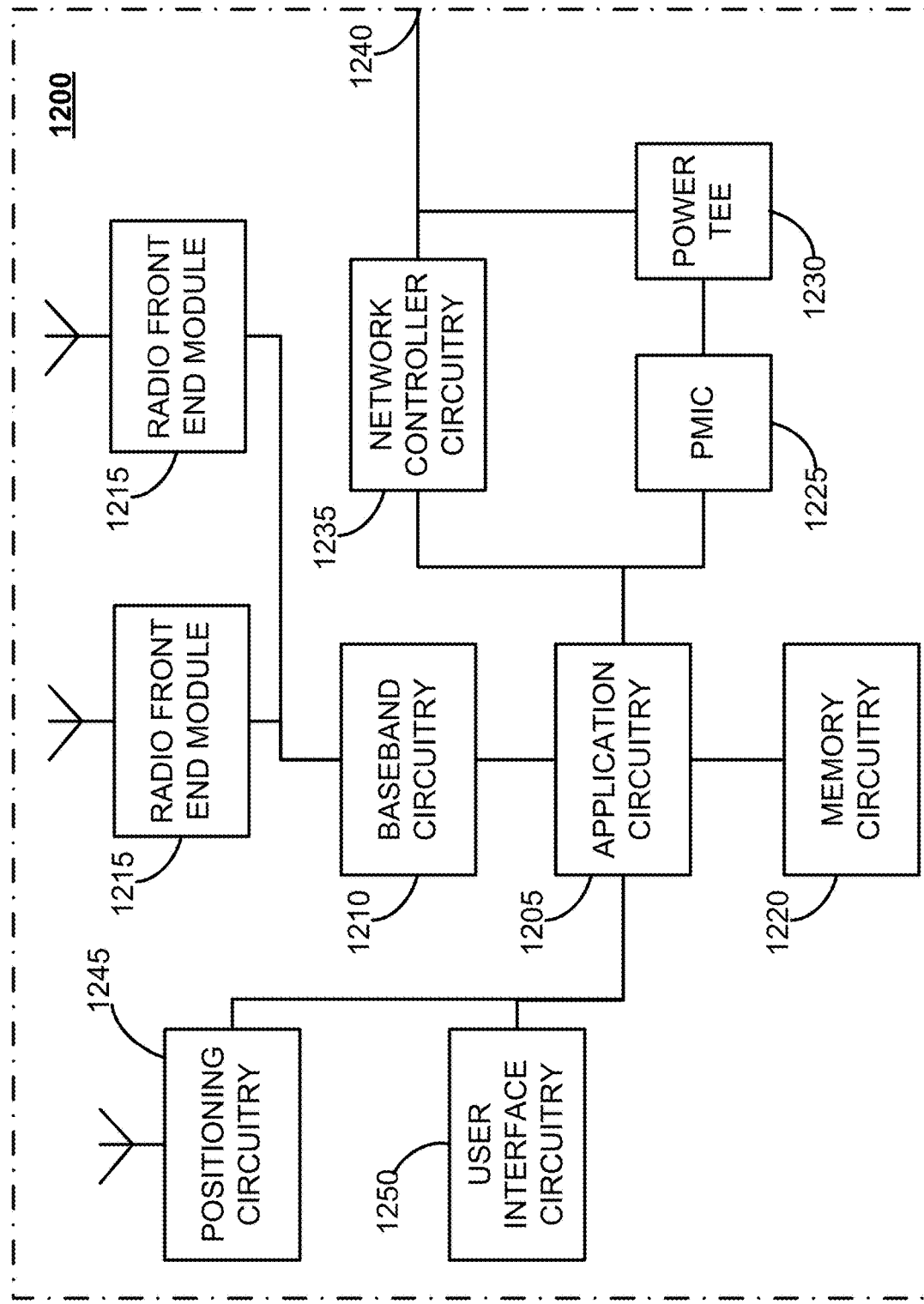
FIG. 12 illustrates an example of infrastructure equipment in accordance with various embodiments.

FIG. 12 illustrates an example of infrastructure equipment 1200 in accordance with various embodiments. The infrastructure equipment 1200 (or "system 1200") may be implemented as a base station, radio head, RAN node, etc., such as the RAN nodes 511 and/or AP 506 shown and described previously. In other examples, the system 1200 could be implemented in or by a UE 501, 601, 701, computer system 200, application server(s) 530, and/or any other element/device discussed herein. The system 1200 includes application circuitry 1205, baseband circuitry 1210, one or more radio front end modules 1215, memory 1220, power management integrated circuitry (PMIC) 1225, power tee circuitry 1230, network controller 1235, network interface connector 1240, satellite positioning circuitry 1245, and user interface 1250. In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) and/or virtual baseband unit pool implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 1205 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or JO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 1205 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 1200 may not utilize application circuitry 1205, and instead may include a special-purpose processor/controller to process IP data received from an EPC or 5GC, for example.

Additionally or alternatively, application circuitry 1205 may include circuitry such as, but not limited to, one or more a FPDs such as field-programmable gate arrays (FPGAs) and the like; PLDs such as CPLDs, HCPLDs, and the like; ASICs such as structured ASICs and the like; programmable SoCs (PSoCs); and the like. In such embodiments, the circuitry of application circuitry 1205 may comprise logic blocks or logic fabric including and other interconnected resources that may be programmed to perform various functions, such as the procedures, methods, functions, etc. of the various embodiments discussed herein. In such embodiments, the circuitry of application circuitry 1205 may include memory cells (e.g., EPROM, electrically EPROM (EEPROM), flash memory, static memory (e.g., SRAM, anti-fuses, etc.) used to store logic blocks, logic fabric, data, etc. in lookup-tables (LUTs) and the like. According to various embodiments, the application circuitry 1205 corresponds with (or is the same or similar to) the processor circuitry 102 of host platform 105 discussed previously with regard to FIG. 1.

The baseband circuitry 1210 may be implemented, for example, as a solder-down substrate including one or more integrated circuits, a single packaged integrated circuit soldered to a main circuit board or a multi-chip module containing two or more integrated circuits. Although not shown, baseband circuitry 1210 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215). According to various embodiments, the baseband circuitry 1210 corresponds with (or is the same or similar to) the baseband circuitry 114 or the modem circuitry 110 discussed previously with regard to FIG. 1.

User interface circuitry 1250 may include one or more user interfaces designed to enable user interaction with the system 1200 or peripheral component interfaces designed to enable peripheral component interaction with the system 1200. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc. According to various embodiments, the user interface circuitry 1250 may be incorporated or coupled with the host platform 105 discussed previously with regard to FIG. 1.

The radio front end modules (RFEMs) 1215 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1215. The RFEMs 1215 may incorporate both millimeter wave antennas and sub-millimeter wave antennas. According to various embodiments, one or more of the RFEMs 1215 corresponds with (or is the same or similar to) the RF circuitry 116 discussed previously with regard to FIG. 1.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards. According to various embodiments, the memory circuitry 1220 corresponds with (or is the same or similar to) the memory circuitry 120 of host platform 105 discussed previously with regard to FIG. 1.

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocol. In some implementations, the network controller circuitry 1235 may include multiple controllers to provide connectivity to other networks using the same or different protocols. According to various embodiments, network controller circuitry 1235 may implement the eRSS mechanisms discussed herein.

The positioning circuitry 1245, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 1245 and/or positioning circuitry implemented by UEs 501, 502, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 1245 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 1245 may provide data to application circuitry 1205 which may include one or more of position data or time data. Application circuitry 1205 may use the time data to synchronize operations with other radio base stations (e.g., RAN nodes 511 or the like).

The components shown by FIG. 12 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including any of the other bus or IX technologies discussed herein. The bus may be a proprietary bus, for example, used in a SoC based system. Other bus systems may be included, such as an I²C interface, an SPI interface, point to point interfaces, and a power bus, among others.

Figure 13:
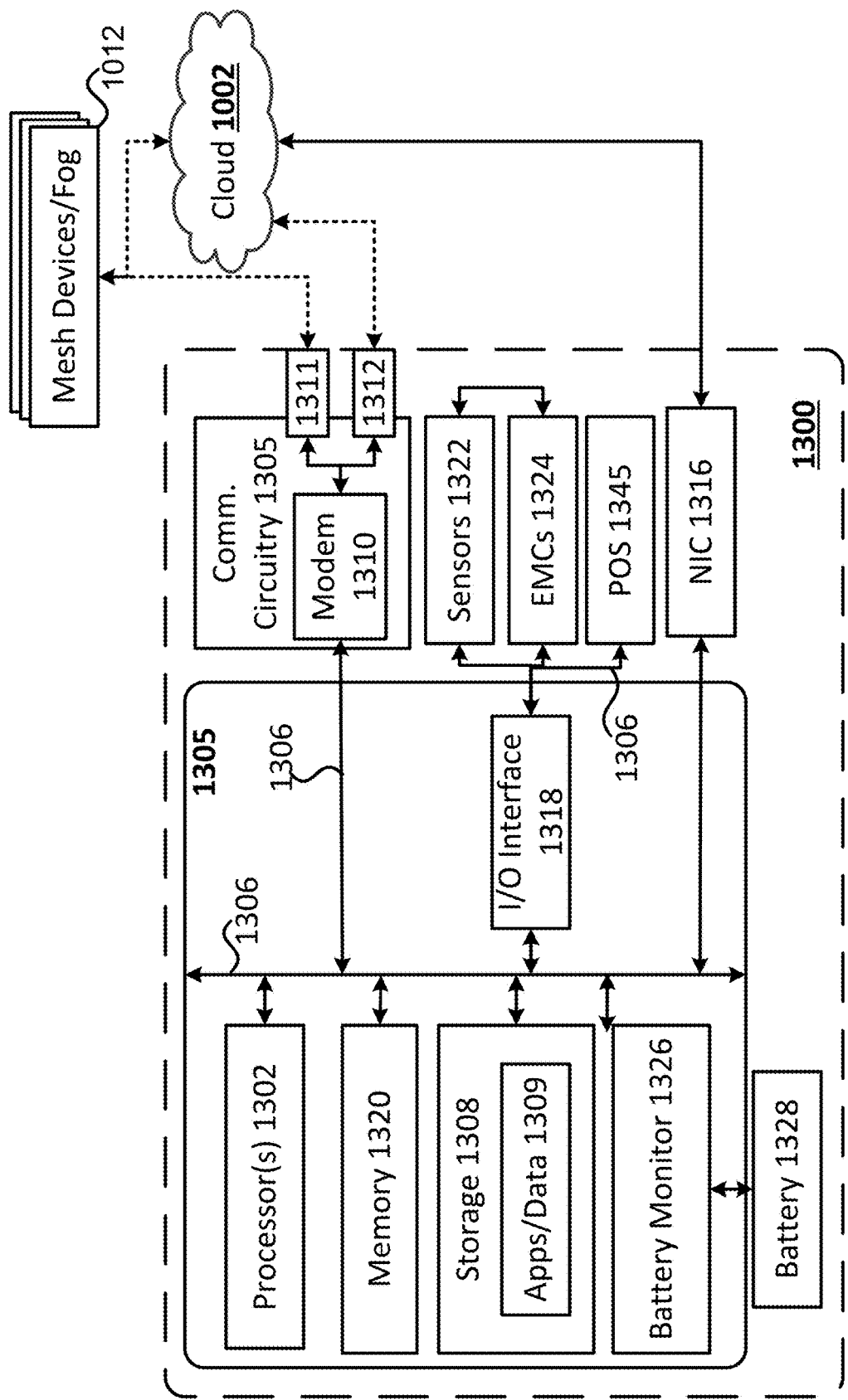
FIG. 13 illustrates an example implementation of a computing platform, in accordance with various embodiments.

FIG. 13 illustrates an example implementation of a computing platform 1300, in accordance with various embodiments. In embodiments, the computing platform 1300 may be suitable for use as computer system 200; UEs 501, 601, and 701; IoT device 804, IoT devices 1014-1024, GW 1010, IoT devices 1104, the one or more network elements 522, the application server 530, and/or any other element/device discussed previously with regard to FIGS. 1-11. FIG. 13 shows a block diagram of an example of components that may be present in the computer platform 1300. The computer platform 1300 may include any combinations of the components shown in the example. The components may be implemented as ICs, portions thereof, discrete electronic devices, or other modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in different implementations.

The computer platform 1300 may include a host platform 1305. The host platform 1305 includes processor circuitry 1302, memory circuitry 1320, storage circuitry 1308, battery monitor 1326, and interface circuitry 1318. The components of host platform 1305 may be coupled via IX 1306 at least as shown. According to various embodiments, the host platform 1305 corresponds with (or is the same or similar to) the host platform 105 discussed previously with regard to FIG. 1.

The processor circuitry 1302 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) of the processor circuitry 1302 may include any combination of general-purpose processors and/or dedicated processors (e.g., graphics processors, application processors, microprocessor(s), a multi-core processor, a multithreaded processor, an ultra-low voltage processor, an embedded processor, or other known processing element. etc.). The processors (or cores) may be coupled with or may include memory/storage and may be configured to execute instructions stored in the memory/storage to enable various applications or operating systems to run on the platform 1300. The processing elements of the processor circuitry 1302 may process IP data packets received from an EPC or 5GC, such as when the IP packets are routed to individual cores of the processor circuitry 1302 by the eRSS mechanisms discussed herein.

Processor circuitry 1302 be or include a microprocessor, a multi-core processor, a multithreaded processor, an ultra-low voltage processor, an embedded processor, or other known processing element. In one example, the processor circuitry 1302 may include an Intel® Architecture Core™ based processor, such as a Quark™, an Atom™, an i3, an i5, an i7, or an MCU-class processor, or another such processor available from Intel® Corporation, Santa Clara, Calif. The processors of the processor circuitry 1302 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the processor circuitry 1302 may be a part of a system on a chip (SoC) in which the processor circuitry 1302 and other components are formed into a single integrated circuit, or a single package, such as the Edison™ or Galileo™ SoC boards from Intel® Corporation.

Additionally or alternatively, processor circuitry 1302 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of processor circuitry 1302 may comprise logic blocks or logic fabric including and other interconnected resources that may be programmed to perform various functions, such as the procedures, methods, functions, etc. of the various embodiments discussed herein. In such embodiments, the circuitry of processor circuitry 1302 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like. According to various embodiments, the processor circuitry 1302 corresponds with (or is the same or similar to) the processor circuitry 102 of host platform 105 discussed previously with regard to FIG. 1.

The processor circuitry 1302 may communicate with a system memory circuitry 1320 over a IX 1306. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data/applications 1309, operating systems and so forth, a mass storage 1308 may also couple to the processor circuitry 1302 via the IX 1306. To enable a thinner and lighter system design the mass storage 1308 may be implemented via a solid state disk drive (SSDD). Other devices that may be used for the mass storage 1308 include flash memory cards, such as SD cards, microSD cards, xD picture cards, and the like, and USB flash drives. In low power implementations, the mass storage 1308 may be on-die memory or registers associated with the processor circuitry 1302. However, in some examples, the mass storage 1308 may be implemented using a micro hard disk drive (HDD). Further, any number of new technologies may be used for the mass storage 1308 in addition to, or instead of, the technologies described, such resistance change memories, phase change memories, holographic memories, or chemical memories, among others. For example, the computer platform 1300 may incorporate the three-dimensional (3D) cross-point (XPOINT) memories from Intel® and Micron®. According to various embodiments, the memory circuitry 1320 and/or the storage circuitry 1308 corresponds with (or is the same or similar to) the memory circuitry 120 of host platform 105 discussed previously with regard to FIG. 1.

The storage circuitry 1308 may include an operating systems (OS) (not shown), which may be a general purpose OS or an OS specifically written for and tailored to the platform 1300. The OS may include one or more drivers, libraries, and/or application programming interfaces (APIs), which provide program code and/or software components for applications/data 1309 and/or control system configurations to control and/or obtain/process data from one or more sensors XB20, ECUs 1322, and/or EMCs 1324. The applications/data 1309 may be software modules/components used to perform various functions of the platform 1300 and/or to carry out functions of the example embodiments discussed herein. In embodiments where the processor circuitry 1302 and memory circuitry 1304 includes hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). In these embodiments, the applications/data 1309 and/or hardware accelerators may process or otherwise utilize IP packets that were routed to individual cores of the processor circuitry 1302 by the eRSS mechanisms discussed herein.

The components of platform 1300 may communicate over the IX 1306. The IXs (or "links") 1306 may include one or any number (or combination) of interconnect and/or bus technologies used to convey data between host platform 105 and modem circuitry 110. Each IX 1306 may include a communications channel between ports of two endpoints (EPs) allowing both of EPs to send and receive configuration, I/O, or memory read/write requests and interrupts. In embodiments where the modem circuitry 110 is mounted to a same PCB as the host platform 105 or is otherwise connected with the host platform 105 via a local bus/IX technology, the modem circuitry 110 and the host platform 105 may include IX interface circuitry comprising a microcontroller or controller, as well as wires used to couple the modem circuitry 110 to the host platform 105 using a suitable through-hole technology (THT), surface-mount technology (SMT), or the like. In embodiments where the modem circuitry 110 is implemented as a modem card or an expansion card, the IX interface circuitry may comprise a microcontroller or other like device to control data transfers (e.g., host controller, switch or bridge, etc.), as well as pins or slots used to couple the modem circuitry 110 with the host platform 105. The IX interface circuitry may also include on-chip memory circuitry including suitable combinations of erasable programmable read-only memory (EPROM), electrically erasable programmable read-only memory (EEPROM), flash memory, SRAM, anti-fuses, etc., which may be used to buffer data packets to be transferred to the host platform 105 and/or to store program code and/or configuration data for implementing the rate-adaptive data transfer mechanisms discussed herein. In some implementations, the IX interface circuitry may be or may include a cache controller or a caching agent (CA). In other implementations, the IX interface circuitry may be a PCIe device or component such as a PCIe root complex (RC) component, a PCIe endpoint (EP) component (e.g., a PCIe-USB host controller), a PCIe RC Integrated EP, a PCIe switch or bridge component, or the like. As examples, the IXs 1306 may include Intel® Ultra Path Interface (UPI), Intel® Accelerator Link (IAL), Common Application Programming Interface (CAPI), Intel® QuickPath Interconnect (QPI), peripheral component interconnect (PCI), PCI express (PCIe), PCI extended (PCIx), RapidIO™ system interconnects, Ethernet, Cache Coherent Interconnect for Accelerators (CCIA), Gen-Z Consortium IXs, Open Coherent Accelerator Processor Interface (OpenCAPI) and/or the like. The IX 1306 may include any number of other technologies, including industry standard architecture (ISA), extended ISA (EISA), a Time-Trigger Protocol (TTP) system, or a FlexRay system, or any number of other technologies. The IX 1306 may be a proprietary bus, for example, used in a SoC based system. Other bus systems may be included, such as an $I^2C$ interface, an SPI interface, point to point interfaces, and a power bus, among others. According to various embodiments, the IX 1306 corresponds with the IX 106 discussed previously with regard to FIG. 1.

The IX 1306 may couple the processor circuitry 1302 to the communication circuitry 1306 for communications with other devices. In embodiments, the communication circuitry 1306 comprises modem circuitry 1310, which may include one or more memory devices (e.g., in-package memory circuitry 113 of FIG. 1), one or more processors (e.g., baseband circuitry 114 of FIG. 1) used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The modem circuitry 1310 comprises program code, modules, logic blocks, and other resources that may be programmed to perform various modem functions, such as processing signals received from a receive signal path of the transceivers 1310, 1311, and generating signals for a transmit signal path of the transceivers 1310, 1311. Modem circuitry 1310 may interface with the application circuitry of the computing platform 1300 for generation and processing of the signals and for controlling operations of the transceivers 1310, 1311. The processors of the communication circuitry 1306 may be the same or similar to the processor circuitry 1302 discussed previously and/or may be the same or similar to the baseband circuitry 110 discussed previously with regard to FIG. 1. In various embodiments, communication circuitry 1306 may interface with the host platform 1305 for generation and processing of the signals and for controlling operations of the transceivers 1311, 1312.

The communication circuitry 1306 may process signals received from receive signal paths of radiofrequency (RF) circuitry (e.g., RF circuitry 116 of FIG. 1) and generate signals for transmit signal paths of the RF circuitry.

In some implementations, the modem circuitry 1310 comprises one or more baseband processors or control logic to process/generate the baseband signals for a corresponding radio access technology (e.g., a baseband processor for communication using LTE, a baseband processor for communicating using 5G/NR, a baseband processor for communicating using WiFi, a baseband processor for Bluetooth/BLE, etc.). In other implementations, some or all of the functionality of the aforementioned baseband processors may be included as modules stored in on-board (or in-package) memory of the modem circuitry 1310 and executed via a Central Processing Unit (CPU) of the modem circuitry 1310. The communication circuitry 1306 may also include interfaces to interface with the processor circuitry 1302 for generation and processing of the baseband signals and for controlling operations of the RF circuitry. The processor circuitry 1302 and processors of the communication circuitry 1306, alone or in combination, may be used to execute elements of one or more instances of a protocol stack. For example, one or more processors of the modem circuitry 1310, alone or in combination, may execute Layer 3, Layer 2, or Layer 1 functionality, while processors of the processor circuitry 1302 may utilize data (e.g., packet data) received from these layers and further execute Layer 4 functionality (e.g., transmission communication protocol (TCP) and user datagram protocol (UDP) layers). As used herein, "Layer 3" may comprise a non-access stratum (NAS) layer and radio resource control (RRC) layer; "Layer 2" may comprise a medium access control (MAC) layer, a radio link control (RLC) layer, and a packet data convergence protocol (PDCP) layer; and "Layer 1" may comprise a physical (PHY) layer of a UE 501, AP 506, and/or RAN node 511.

The modem circuitry 1310 is capable of handling various radio control functions that enable communication with one or more radio networks according to one or more particular wireless communications protocols via the RF circuitry (e.g., devices 1311 and 1312). The radio control functions may include, but are not limited to, signal modulation/demodulation, encoding/decoding, radio frequency shifting, etc. In some embodiments, modulation/demodulation circuitry of the modem circuitry 1310 may include Fast-Fourier Transform (FFT), precoding, or constellation mapping/de-mapping functionality. In some embodiments, encoding/decoding circuitry of the communication circuitry 1306 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

The communication circuitry may include RF circuitry to enable communication with various wireless networks using modulated electromagnetic radiation through a non-solid medium. In various embodiments, the RF circuitry may include switches, filters, amplifiers, etc. to facilitate the communication with the various wireless networks (e.g., network 150, cloud 1002, etc.). The RF circuitry may include a receive signal path which may include circuitry to down-convert RF signals received from front-end module (FEM) circuitry and provide baseband signals to the baseband processors discussed previously. The RF circuitry may also include a transmit signal path which may include circuitry to up-convert baseband signals provided by the baseband processors and provide RF output signals to the FEM circuitry for transmission. The RF circuitry may include the devices 1311 and 1312.

The device 1311 (also referred to as a "mesh transceiver" and the like) may be used for communications with other mesh devices 1311, which may be included in a fog as discussed previously. The mesh transceiver 1311 may use any number of frequencies and protocols. For example, the mesh transceiver 1311 may transmit/receive signals in the 2.4 gigahertz (GHz) range as specified by the IEEE 802.15.4 standard, or utilize other wireless communications protocols for communicating with mesh devices 1311, such as the Bluetooth® low energy (BLE) standard, as defined by the Bluetooth® Special Interest Group, or the ZigBee® standard, among others. The communication circuitry 1306 may be configured for any particular wireless communications protocol for the connections to the mesh devices 1311. For example, mesh transceiver 1311 may implement Wi-Fi™ communications in accordance with the Institute of Electrical and Electronics Engineers (IEEE) 802.11 standard. In addition, wireless wide area communications, for example, according to a cellular or other wireless wide area protocol, can occur via a wireless wide area network (WWAN) or via a specific cellular network.

The mesh transceiver 1311 may include multiple radios (e.g., including hardware devices such as switches, filters, amplifiers, antenna elements, and the like to facilitate the communications over the air) to communicate using multiple standards for communications at different range. For example, the computer platform 1300 may communicate with close devices (e.g., within about 10 meters) using a local transceiver based on BLE, or another low power radio, to save power. More distant mesh devices 1311 (e.g., within about 50 meters) may be reached over ZigBee or other intermediate power radios. Both communications techniques may take place over a single radio at different power levels, or may take place over separate transceivers/radios, for example, a local transceiver/radio using BLE and a separate mesh transceiver/radio using ZigBee. Utilizing different wireless communications protocols may or may not include utilizing different radios within the mesh transceiver 1311. The mesh transceiver 1311 may be incorporated into an MCU as an address directly accessible by the chip, such as in the Curie® units available from Intel.

The device 1312 (also referred to as a "cloud transceiver" and the like) may include one or more radios (e.g., including hardware devices such as switches, filters, amplifiers, antenna elements, and the like to facilitate the communications over the air) to communicate with devices in the cloud. For example, the cloud transceiver 1312 may transmit/receive signals in the 2.4 GHz range as specified by the IEEE 802.15.4/g standards, and/or utilize other wireless communications protocols for communicating over the cloud, such as LoRaWAN™ (Long Range Wide Area Network) developed by Semtech and the LoRa Alliance, one or more WiFi protocols, and/or one or more cellular protocols discussed herein. Utilizing different wireless communications protocols may or may not include utilizing different radios within the cloud transceiver 1312. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the devices 1311 and 1312, as described herein. For example, the communication circuitry 1306 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The devices 1311 and 1312 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1312, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry (NIC) 1316 (also referred to as "network interface controller(s)" and the like) may be included to provide a wired communication to the cloud 1002 or to other devices, such as the mesh devices 1311. To this end, the NIC 1316 may include one or more dedicated processors and/or FPGAs to communicate using one or more wired communications protocol. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, a Time-Trigger Protocol (TTP) system, or a FlexRay system, among many others. An additional NIC 1316 may be included to allow connect to a second network, for example, a NIC 1316 providing communications to the cloud 1002 over Ethernet, and a second NIC 1316 providing communications to other devices over another type of network, such as a personal area network (PAN) including a personal computer (PC) device. According to various embodiments, NIC 1316 may implement the eRSS mechanisms discussed herein.

The IX 1306 may couple the processor circuitry 1302 to an interface circuitry 1318 that is used to connect external devices. The external devices may include sensors 1322, such as accelerometers, level sensors, flow sensors, temperature sensors, pressure sensors, barometric pressure sensors, and the like. The interface circuitry 1318 may be used to connect the computer platform 1300 to electro-mechanical components (EMCs) 1324, which may allow computer platform 1300 to change its state, position, and/or orientation, or move or control a mechanism or system. The EMCs 1324 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electromechanical components. In embodiments, computer platform 1300 may be configured to operate one or more EMCs 1324 based on one or more captured events and/or instructions or control signals received from a service provider and/or various clients. Additionally, the interface circuitry 1318, sensors 1322, and/or EMCs 1324 may be collectively referred to as "event capture circuitry" and the like. In some embodiments, the event capture circuitry may also include battery monitor/charger 1326, the processor circuitry 1302, and/or other components in or coupled with platform 1300. In some implementations, the interface circuitry 1318 may connect the platform 1300 with positioning circuitry 1345, which may be the same or similar as the positioning circuitry 1245 discussed with regard to FIG. 12.

A battery 1328 may power the platform 1300, although in some examples the platform 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in V2X applications, the battery 1328 may be a typical lead-acid automotive battery.

In some implementations, the battery 1328 may be a "smart battery," which includes or is coupled with a Battery Management System (BMS) or battery monitoring integrated circuitry. The BMS may be included in the platform 1300 to track the state of charge (SoCh) of the battery 1328. The BMS may be used to monitor other parameters of the battery 1328 to provide failure predictions, such as the state of health (SoH) and the state of function (SoF) of the battery 1328. The BMS may communicate the information of the battery 1328 to the processor circuitry 1302 or other components of the platform 1300. The BMS may also include an analog-to-digital (ADC) convertor that allows the processor circuitry 1302 to directly monitor the voltage of the battery 1328 or the current flow from the battery 1328. The battery parameters may be used to determine actions that the platform 1300 may perform, such as transmission frequency, network operation, sensing frequency, and the like.

A power block, or other power supply coupled to an electrical grid may be coupled with the BMS to charge the battery 1328. In some examples, the power block may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1328, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 14:
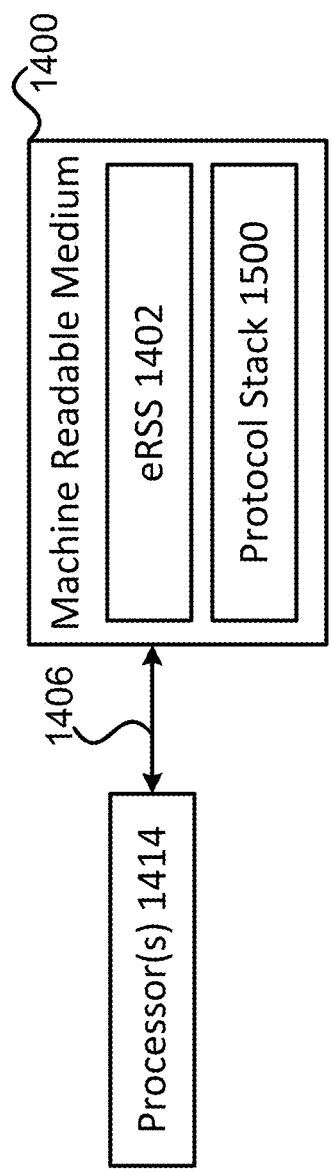
FIG. 14 illustrates example of computer-readable non-transitory storage media that may be suitable for use to store instructions that cause an apparatus, in response to execution of the instructions by the apparatus, to practice selected aspects of the present disclosure.

FIG. 14 illustrates an example of computer-readable non-transitory storage media 1400 that may be suitable for use to store instructions that cause an apparatus, in response to execution of the instructions by the apparatus, to practice selected aspects of the present disclosure. The non-transitory computer-readable storage media may include a number of programming instructions that may be configured to enable a computer system/device (e.g., computer system 200), in response to execution of the programming instructions, to implement (aspects of) the eRSS 202 discussed previously. In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

FIG. 14 is a block diagram of a non-transitory, machine readable medium 1400 including code to direct processor circuitry 1414 to perform various functions delineated by the embodiments discussed herein. In embodiments, the non-transitory, machine readable medium 1400 may be implemented in modem circuitry 110 (e.g., as in-package circuitry 113 or the like) discussed previously with regard to FIG. 1. The processor circuitry 1414 may access the non-transitory, machine readable medium 1400 over a bus 1406. The processor circuitry 1414 and bus 1406 may be selected as described with respect to the baseband circuitry 114 and IX 106 of FIG. 1. The non-transitory, machine readable medium 1400 may include any combination of memory devices discussed previously.

The non-transitory, machine readable medium 1400 may include code of eRSS 1402 to direct the processor circuitry 1414 to control storage of a processor core lookup table (PCLT) 210 in the in-package memory circuitry 113, wherein the PCLT 210 is to map network-specific identifiers (NSIs) to core identifiers (CIDs) of a plurality of NIS-CIS pairs for a plurality of cores of application processor circuitry of a host platform to which the SoC is coupled. During operation, the code of eRSS 1402 is to direct the processor circuitry 1414 to extract, from a data packet received by the processor (baseband) circuitry 1414, an NSI of the data packet; perform a lookup operation on the PCLT 210 using the extracted NSI to obtain a CID; and send the data packet to a processor core 103 of the multi-core application processor circuitry 102 that is associated with the determined CID. The code of eRSS 1402 may also direct the processor (baseband) circuitry 1414 to perform various other functions as discussed herein.

Figure 15:
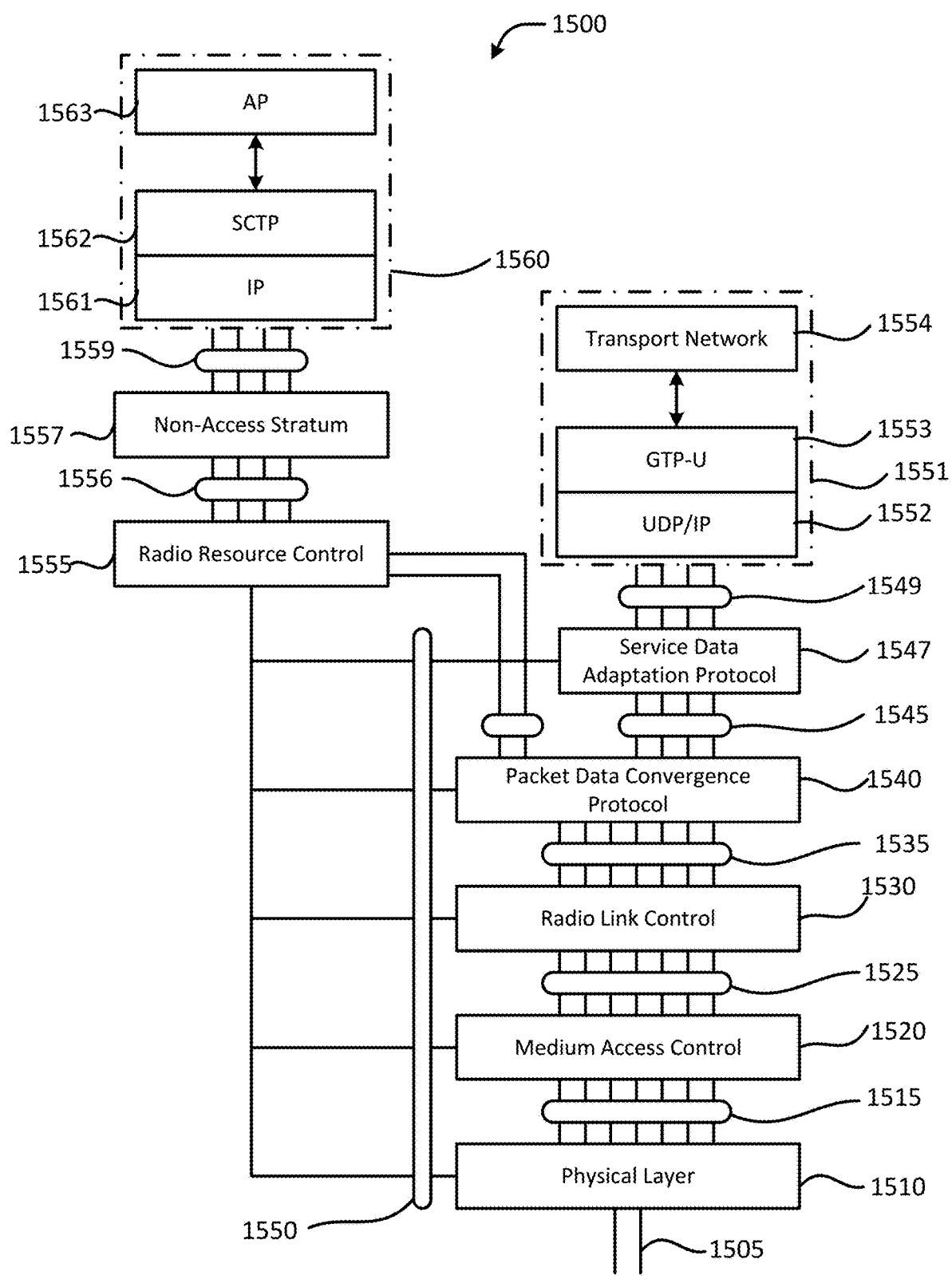
FIG. 15 illustrates various protocol functions that may be implemented in a wireless communication device according to various embodiments.

The non-transitory, machine readable medium 1400 may include code of protocol stack 1500 to direct the processor (baseband) circuitry 1414 to perform various protocol functions, which are discussed in more detail with regard to FIG. 15.

FIG. 15 illustrates various protocol functions that may be implemented in a wireless communication device according to various embodiments. In particular, FIG. 15 includes an arrangement 1500 showing interconnections between various protocol layers/entities. The following description of FIG. 15 is provided for various protocol layers/entities that operate in conjunction with the Fifth Generation (5G) or New Radio (NR) system standards and LTE system standards, but some or all of the aspects of FIG. 15 may be applicable to other wireless communication network systems as well, such as WiFi networks, short-range or personal area networks, non-3GPP cellular networks, and the like.

The protocol layers of arrangement 1500 may include one or more of a physical layer (PHY) 1510, a medium access control layer (MAC) 1520, a radio link control layer (RLC) 1530, a packet data convergence protocol layer (PDCP) 1540, a service data adaptation protocol layer (SDAP) 1547, a radio resource control layer (RRC) 1555, and a non-access stratum (NAS) layer 1557, in addition to other higher layer functions not illustrated. PDCP 1540, RLC 1530, and MAC 1520 may correspond to the PDCP, RLC, and MAC layers, respectively, of the L2 stack 203 of FIG. 2. The protocol layers may include one or more service access points (e.g., items 1559, 1556, 1549, 1545, 1535, 1525, and 1515 in FIG. 15) that may provide communication between two or more protocol layers.

The PHY 1510 may transmit and receive physical layer signals 1505 that may be received from or transmitted to one or more other communication devices. The physical layer signals 1505 may comprise one or more physical channels, such as those discussed herein. The PHY 1510 may further perform link adaptation or adaptive modulation and coding (AMC), power control, cell search (e.g., for initial synchronization and handover purposes), and other measurements used by higher layers, such as the RRC 1555. The PHY 1510 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 1510 may process requests from and provide indications to an instance of MAC 1520 via one or more physical layer service access points (PHY-SAP) 1515. According to some embodiments, requests and indications communicated via PHY-SAP 1515 may comprise one or more transport channels.

Instance(s) of MAC 1520 may process requests from, and provide indications to an instance of RLC 1530 via one or more medium access control service access points (MAC-SAP) 1525. These requests and indications communicated via the MAC-SAP 1525 may comprise one or more logical channels. The MAC 1520 may perform mapping between the logical channels and transport channels, multiplexing of MAC SDUs from one or more logical channels onto transport blocks (TB) to be delivered to PHY 1510 via the transport channels, de-multiplexing MAC SDUs to one or more logical channels from TBs delivered from the PHY 1510 via transport channels, multiplexing MAC SDUs onto TBs, scheduling information reporting, error correction through hybrid automatic repeat request (HARD), and logical channel prioritization.

Instance(s) of RLC 1530 may process requests from and provide indications to an instance of PDCP 1540 via one or more radio link control service access points (RLC-SAP) 1535. These requests and indications communicated via RLC-SAP 1535 may comprise one or more RLC channels. The RLC 1530 may operate in a plurality of modes of operation, including: Transparent Mode (TM), Unacknowledged Mode (UM), and Acknowledged Mode (AM). The RLC 1530 may execute transfer of upper layer protocol data units (PDUs), error correction through automatic repeat request (ARQ) for AM data transfers, and concatenation, segmentation and reassembly of RLC SDUs for UM and AM data transfers. The RLC 1530 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1540 may process requests from and provide indications to instance(s) of RRC 1555 and/or instance(s) of SDAP 1547 via one or more packet data convergence protocol service access points (PDCP-SAP) 1545. These requests and indications communicated via PDCP-SAP 1545 may comprise one or more radio bearers. The PDCP layer 1504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.). In LTE implementations, the eRSS 202/1402 may be disposed or otherwise located above the PDCP 1540, or the eRSS 202/1402 may be fully or partially combined with the PDCP 1540. In these implementations, the eRSS mechanism 202/1402 is to extract the NSI from a header or body portion of a PDCP PDU or the header or body portion of an RLC SDU.

Instance(s) of SDAP 1547 may process requests from and provide indications to one or more higher layer protocol entities via one or more service data adaptation protocol service access points (SDAP-SAP) 1549. These requests and indications communicated via SDAP-SAP 1549 may comprise one or more quality of service (QoS) flows. The SDAP 1547 may map QoS flows to data radio bearers (DRBs), and vice versa, and may also mark QoS flow IDs (QFIs) in DL and UL packets. A single SDAP entity 1547 may be configured for an individual PDU session. In the UL direction, the NG-RAN 520 may control the mapping of QoS Flows to DRB(s) in two different ways, reflective mapping or explicit mapping. For reflective mapping, the SDAP 1547 of a UE 501 may monitor the QoS flow ID(s) of the DL packets for each DRB, and may apply the same mapping for packets flowing in the UL direction. For a DRB, the SDAP 1547 of the UE 501 may map the UL packets belonging to the QoS flows(s) corresponding to the QoS flow ID(s) and PDU Session observed in the DL packets for that DRB. To enable reflective mapping, the NG-RAN 710 may mark DL packets over the Uu interface with a QoS flow ID. The explicit mapping may involve the RRC 1555 configuring the SDAP 1547 with an explicit QoS flow to DRB mapping rule, which may be stored and followed by the SDAP 1547. In embodiments, the SDAP 1547 may only be used in NR implementations and may not be used in LTE implementations. In some NR implementations, the eRSS 202/1402 may be disposed or otherwise located between the SDAP 1547 and the PDCP 1540. In other NR implementations, the eRSS 202/1402 may be fully or partially combined with the PDCP 1540, fully or partially combined with the SDAP 1547, or partially combined with the both the PDCP 1540 and SDAP 1547.

The RRC 1555 may configure, via one or more management service access points (M-SAP), aspects of one or more protocol layers, which may include one or more instances of PHY 1510, MAC 1520, RLC 1530, PDCP 1540 and SDAP 1547. In embodiments, an instance of RRC 1555 may process requests from and provide indications to one or more NAS entities 1557 via one or more RRC service access points (RRC-SAP) 1556. The main services and functions of the RRC 1555 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 501 and RAN 520 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 1557 may form the highest stratum of the control plane between the UE 501 and the AMF 721. The NAS 1557 may support the mobility of the UEs 501 and the session management procedures to establish and maintain IP connectivity between the UE 101 and a P-GW in LTE systems.

According to various embodiments, one or more protocol entities of arrangement 1500 may be implemented in UEs 501, RAN nodes 511, AMF 721 in NR implementations or MME 621 in LTE implementations, UPF 702 in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMF 721, etc. may communicate with a respective peer protocol entity that may be implemented in or on another device using the services of respective lower layer protocol entities to perform such communication. In some embodiments, a gNB-central unit (gNB-CU) of the gNB 511 may host the RRC 1555, SDAP 1547, and PDCP 1540 of the gNB that controls the operation of one or more gNB-distributed units (DUs), and the gNB-DUs of the gNB 511 may each host the RLC 1530, MAC 1520, and PHY 1510 of the gNB 511.

In a first example, a control plane protocol stack may comprise, in order from highest layer to lowest layer, NAS 1557, RRC 1555, PDCP 1540, RLC 1530, MAC 1520, and PHY 1510. In this example, upper layers 1560 may be built on top of the NAS 1557, which includes an internet protocol layer (IP) 1561, an Stream Control Transmission Protocol layer (SCTP) XV62, and an application layer signaling protocol (AP) 1563.

In NR implementations, the AP 1563 may be an NG application protocol layer (NGAP or NG-AP) 1563 for the NG interface 513 defined between the NG-RAN node 511 and the AMF 721, or the AP 1563 may be an Xn application protocol layer (XnAP or Xn-AP) 1563 for the Xn interface 512 that is defined between two or more RAN nodes 511.

The NG-AP 1563 may support the functions of the NG interface 513 and may comprise Elementary Procedures (EPs). An NG-AP EP may be a unit of interaction between the NG-RAN node 511 and the AMF 721. The NG-AP 1563 services may comprise two groups: UE-associated services (e.g., services related to a UE 101, 102) and non-UE-associated services (e.g., services related to the whole NG interface instance between the NG-RAN node 511 and AMF 721). These services may include functions including, but not limited to: a paging function for the sending of paging requests to NG-RAN nodes 511 involved in a particular paging area; UE Context management function for allowing the AMF 721 to establish, modify, and/or release a UE Context in the AMF 721 and the NG-RAN node 511; mobility function for UEs 501 in ECM-CONNECTED mode for intra-system HOs to support mobility within NG-RAN and inter-system HOs to support mobility from/to EPS systems; NAS Signaling Transport function for transporting or rerouting NAS messages between UE 501 and AMF 721; a NAS node selection function for determining an association between the AMF 721 and the UE 501; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 511 via CN 520; and/or other like functions.

The XnAP 1563 may support the functions of the Xn interface 512 and may comprise XnAP basic mobility procedures and XnAP global procedures. The XnAP basic mobility procedures may comprise procedures used to handle UE mobility within the NG RAN 520 (or E-UTRAN 520), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 1563 may be an S1 Application Protocol layer (S1-AP) 1563 for the S1 interface 513 defined between an E-UTRAN node 511 and an MME, or the AP 1563 may be an X2 application protocol layer (X2AP or X2-AP) 1563 for the X2 interface 512 that is defined between two or more E-UTRAN nodes 511.

The S1 Application Protocol layer (S1-AP) 1563 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 1563 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1563 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) XV62 may provide guaranteed delivery of application layer messages (e.g., NGAP or XnAP messages in NR implementations, or S1-AP or X2AP messages in LTE implementations). The SCTP 1563 may ensure reliable delivery of signaling messages between the RAN node 511 and the AMF 721/MME 621 based, in part, on the IP protocol, supported by the IP 1561. The Internet Protocol layer (IP) 1561 may be used to perform packet addressing and routing functionality. In some implementations the IP layer 1561 may use point-to-point transmission to deliver convey PDUs. In this regard, the RAN node 511 may comprise L2 and L1 layer communication links (e.g., wired or wireless) with the MME/AMF to exchange information.

In a second example, a user plane protocol stack may comprise, in order from highest layer to lowest layer, SDAP 1547, PDCP 1540, RLC 1530, MAC 1520, and PHY 1510. The user plane protocol stack may be used for communication between the UE 501, the RAN node 511, and UPF 702 in NR implementations or an S-GW ZR122 and P-GW 623 in LTE implementations. In this example, upper layers 1551 may be built on top of the SDAP 1547, and may include a user datagram protocol (UDP) and IP security layer (UDP/IP) 1552, a General Packet Radio Service (GPRS) Tunneling Protocol for the user plane layer (GTP-U) 1553, and a User Plane Protocol Data Unit layer (UP PDU) 1563.

The transport network layer 1554 (also referred to as a "transport layer") may be built on IP transport, and the GTP-U 1551 may be used on top of the UDP/IP layer 703 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1553 may be used for carrying user data within the GPRS core network and between the radio access network and the core network. The user data transported can be packets in any of IPv4, IPv6, or PPP formats, for example. The UDP/IP 1552 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer 1511, an L2 layer, the UDP/IP layer 1552, and the GTP-U 1553. The S-GW 622 and the P-GW 623 may utilize an S5/S8a interface to exchange user plane data via a protocol stack comprising an L1 layer, an L2 layer, the UDP/IP layer 1552, and the GTP-U 1553. As discussed previously, NAS protocols may support the mobility of the UE 501 and the session management procedures to establish and maintain IP connectivity between the UE 501 and the P-GW 623.

Moreover, although not shown by FIG. 15, an application layer may be present above the AP 1563 and/or the transport network layer 1554. The application layer may be a layer in which a user of the UE 501, RAN node 511, or other network element interacts with software applications being executed, for example, by application circuitry 605 or application circuitry 705, respectively (or processor circuitry 102). The application layer may also provide one or more interfaces for software applications to interact with communications systems of the UE 501 or RAN node 511, such as the baseband circuitry 114/1210 or modem circuitry 110/1310. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 16:
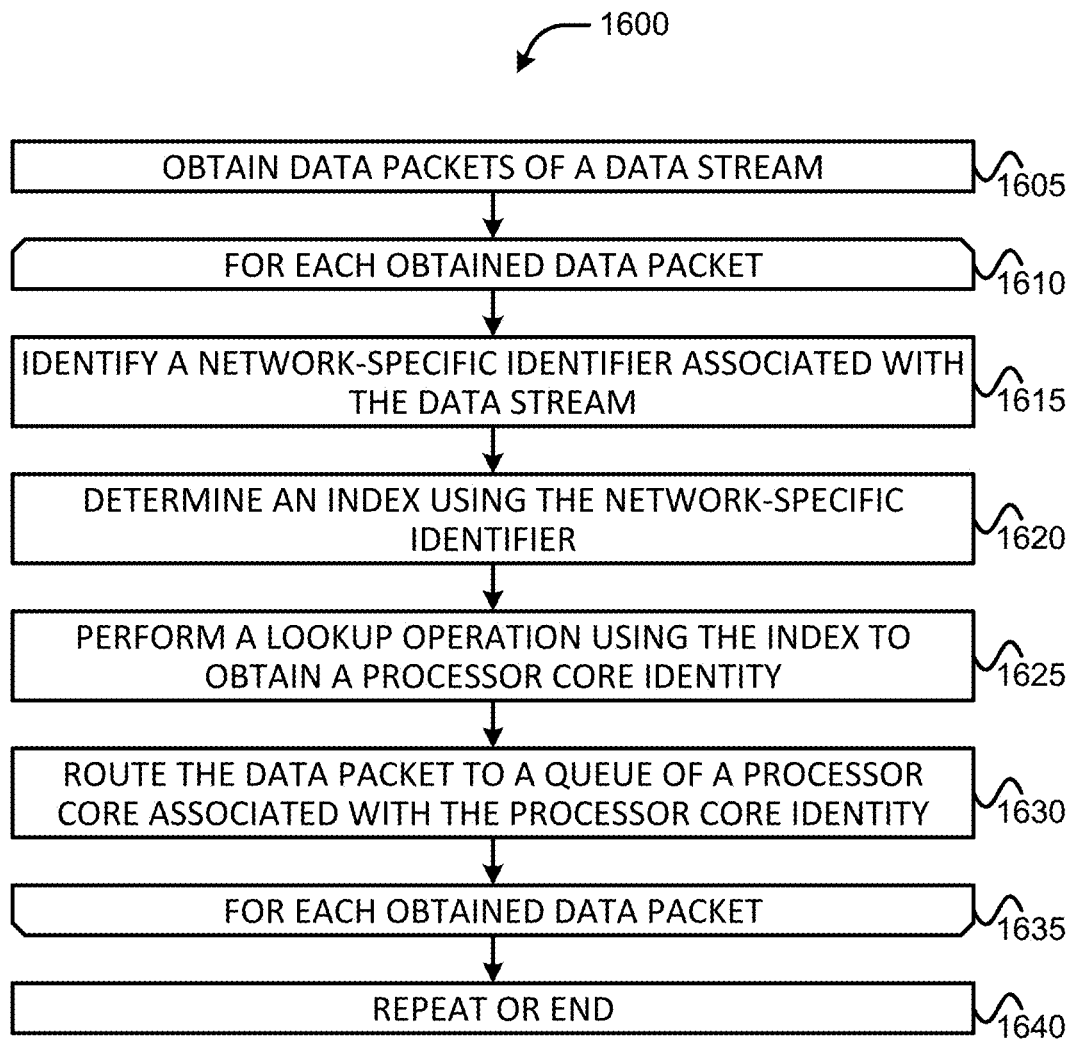
FIG. 16 illustrates an example eRSS process according to various embodiments.

FIG. 16 illustrates an eRSS process 1600 for practicing the eRSS mechanisms of the present disclosure. For illustrative purposes, the operations of process 1600 are described as being performed by the various elements as described with respect to FIGS. 1-15 and/or between the various elements discussed with respect to FIGS. 1-15. While particular examples and orders of operations are illustrated in FIG. 16, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring to FIG. 16, process 1600 may begin at operation 1605 where baseband circuitry 114 may obtain data packets of a data stream, and may make the data packets available for consumption by the host platform 105. In embodiments, operation 1605 may involve demodulating and decoding signals received over-the-air (OTA), etc. At open loop operation 1610, the baseband circuitry 114 is to operate the eRSS 202 to process each obtained data packet in turn.

At operation 1615, the baseband circuitry 114 is to operate the eRSS 202 to identify a network-specific identifier (NSI) of the data packets or otherwise associated with the data stream. In embodiments, the network-specific identifier may be a session identifier or a data stream identifier. In some embodiments, the NSI may be a PDN name/identity, an EPS bearer identity, a QoS Flow identifier, or some other EPS of QoS flow related identity or parameter.

At operation 1620, the baseband circuitry 114 is to operate the eRSS 202 to determine an index using the NSI. In embodiments, the index may be a hash value, and the eRSS 202 may calculate the hash value using a suitable hash function 207.

At operation 1625, the baseband circuitry 114 is to operate the eRSS 202 to perform a lookup operation using the index to obtain a processor core identifier (CID). In embodiments, the eRSS 202 may perform the lookup operation on a processor core lookup table (PCLT) 210, wherein the PCLT 210 is to map NSIs to CIDs of a plurality of NSI-CIS pairs for a plurality of processor cores 103 of application processor circuitry 102 of a host platform 105. In embodiments, the PCLT 210 may be stored in the in-package memory circuitry 113 of the modem circuitry 110.

At operation 1630, the baseband circuitry 114 is to operate the eRSS 202 to route the data packet to a queue of a processor core 103 associated with the obtained CID. In embodiments, the eRSS 202 may be routed to the queue using an appropriate interrupt request (IRQ), deferred procedure call (DPC), or the like. In embodiments, the eRSS 202 may trigger an IRQ associated with the Rx queue to notify the processor core associated with the determined CID that the data packet is ready for storage in the Rx queue At closing loop operation 1635, the baseband circuitry 114 is to operate the eRSS 202 to process a next data packet of the data stream, if any. If there are no remaining data packets to process, the eRSS 202 may proceed to operation 1640 where the baseband circuitry 114 may end process 1600 or repeat process 1600 as necessary.

IV. Examples

Some non-limiting examples are as follows. The following examples pertain to further embodiments, and specifics in the examples may be used anywhere in one or more embodiments discussed previously. Any of the following examples may be combined with any other example, or any embodiment discussed herein, unless explicitly stated otherwise.

Example 1 includes a system on chip (SoC) for wireless communication modulation and demodulation, the SoC comprising: baseband circuitry with in-package memory circuitry, the baseband circuitry to: control storage of a processor core lookup table (PCLT) in the in-package memory circuitry, wherein the PCLT is to map network-specific identifiers (NSIs) to core identifiers (CDs) of a plurality of NSI-CIS pairs for a plurality of cores of application processor circuitry of a host platform to which the SoC is coupled, and operate an enhanced receive side scaling (eRSS) entity to send a data packet to a processor core of the multi-core application processor circuitry that is associated with a CID obtained from the PCLT based on an NSI of the data packet.

Example 2 includes the SoC of example 1 and/or some other examples herein, wherein the baseband circuitry is to operate the eRSS entity to: perform a lookup operation on the PCLT using the NSI of the data packet to obtain the CID of the data packet.

Example 3 includes the SoC of example 2 and/or some other examples herein, wherein, to perform the lookup operation, the baseband circuitry is to operate the eRSS entity to: calculate a hash of the NSI to obtain an index; and use the index to obtain the CID of the data packet.

Example 4 includes the SoC of examples 1-3 and/or some other examples herein, wherein the baseband circuitry is to operate the eRSS entity to: extract the NSI of the data packet from the data packet.

Example 5 includes the SoC of example 4 and/or some other examples herein, wherein, to extract the NSI, the baseband circuitry is to operate the eRSS entity to: extract the NSI from a Packet Data Convergence Protocol (PDCP) protocol data unit (PDU) header of the data packet.

Example 6 includes the SoC of examples 1-2 and/or some other examples herein, wherein the in-package memory circuitry comprises a cache memory device, and wherein the baseband circuitry is to operate the eRSS entity to: identify a descriptor of the data packet from a layer 2 (L2) protocol stack used for processing the data packet; and retrieve the descriptor from the in-package memory circuitry.

Example 7 includes the SoC of example 6 and/or some other examples herein, wherein the eRSS entity is located in a PDCP layer of the L2 protocol stack, or the eRSS entity is located above the PDCP layer.

Example 8 includes the SoC of examples 1-7 and/or some other examples herein, wherein, to send the data packet to the processor core of the multi-core application processor circuitry, the baseband circuitry is to: control storage of the data packet in a receive (Rx) queue associated with the determined CID, wherein the Rx queue is located in the host platform.

9 includes the SoC of example 8 and/or some other examples herein, wherein the SoC further comprises interconnect (IX) interface circuitry, and wherein, to control storage of the data packet in the Rx queue, the IX interface circuitry is to: trigger an interrupt request (IRQ) associated with the Rx queue to notify the processor core associated with the determined CID that the data packet is ready for storage in the Rx queue.

Example 10 includes the SoC of examples 1-9 and/or some other examples herein, wherein the SoC is to operate as a fourth generation (4G) Long Term Evolution (LTE) modem, and the NSI is an Evolved Packet System (EPS) ID, a Packet Data Network (PDN) ID, an Access Point Name (APN), or a Quality of Service (QoS) Class Identifier (QCI), or wherein the SoC is to operate as a fifth generation (5G) New Radio (NR) modem, and the NSI is a QoS Flow Identifier (QFI) or a Fifth Generation (5G) QoS Identifier (5QI).

Example 11 includes one or more computer-readable storage media (CRSM) comprising instructions, wherein execution of the instructions by circuitry of a user equipment (UE) is to cause the UE to operate an enhanced receive side scaling (eRSS) entity of the UE to: extract, from each obtained data packet of a data stream, a network-specific identifier (NSI) of each obtained data packet or an NSI associated with the data stream; perform a lookup operation on an indirection table using the extracted NSI to obtain a CID, wherein the indirection table is to store a plurality of CIDs in association with a corresponding NSI, wherein each CID of the plurality of CIDs corresponds with a processor core of a plurality of processor cores of multi-core processor circuitry; and control storage of the data packet in a receive (Rx) queue associated with the obtained CID.

Example 12 includes the one or more CRSM of example 11 and/or some other examples herein, wherein, to perform the lookup operation, execution of the instructions is to cause the UE to operate the eRSS entity to: calculate a hash of the NSI to obtain an index; and use the index to obtain the CID of the data packet.

Example 13 includes the one or more CRSM of examples 11-12 and/or some other examples herein, wherein, to extract the NSI, execution of the instructions is to cause the UE to operate the eRSS entity to: identify a descriptor of the data packet from a layer 2 (L2) protocol stack used for processing the data packet; and retrieve the descriptor from the in-package memory circuitry.

Example 14 includes the one or more CRSM of example 13 and/or some other examples herein, wherein the eRSS entity is located in a Packet Data Convergence Protocol (PDCP) layer of the L2 protocol stack, or the eRSS entity is located above the PDCP layer, and wherein, to extract the NSI, execution of the instructions is to cause the UE to operate the eRSS entity to: extract the NSI from a PDCP protocol data unit (PDU) header of the data packet.

Example 15 includes the one or more CRSM of examples 11-14 and/or some other examples herein, wherein, to control storage of the data packet in the Rx queue, execution of the instructions is to cause the UE to operate the eRSS entity to: issue a deferred procedure call (DPC) associated with the Rx queue.

Example 16 includes the one or more CRSM of examples 11-15 and/or some other examples herein, wherein, to control storage of the data packet in the Rx queue, execution of the instructions is to cause the UE to operate the eRSS entity to: trigger an interrupt request (IRQ) associated with the Rx queue to notify the processor core associated with the obtained CID that the data packet is ready for storage in the Rx queue.

Example 17 includes the one or more CRSM of examples 11-16 and/or some other examples herein, wherein the NSI is an Evolved Packet System (EPS) identity, a Packet Data Network (PDN) identity, an Access Point Name (APN), or a Quality of Service (QoS) Class Identifier (QCI), a QoS Flow Identifier (QFI), or a Fifth Generation (5G) QoS Identifier (5QI).

Example 18 includes a computer system capable of wireless communication, the system comprising: a host platform comprising multi-core processor circuitry and system memory circuitry; and modem circuitry coupled with the host platform via an interconnect (IX), wherein the modem circuitry comprises baseband circuitry and in-package memory circuitry, wherein the in-package memory circuitry is to store an enhanced receive side scaling (eRSS) entity, wherein the baseband circuitry is to operate the eRSS entity to route data packets to individual cores of the multi-core processor circuitry over the IX based on network-specific identifiers (NSIs) of the data packets.

Example 19 includes the system of example 18 and/or some other examples herein, wherein the in-package memory circuitry is to store a processor core lookup table (PCLT), wherein the PCLT is to map NSIs to core identifiers (CIDs) of a plurality of NSI-CIS pairs for the individual cores, and the baseband circuitry is to operate the eRSS entity to: extract, from a data packet received by the baseband circuitry, a NSI of the data packet; perform a lookup operation on the PCLT using the extracted NSI to obtain a CID; and send the data packet to a processor core of the multi-core processor circuitry that is associated with the determined CID.

Example 20 includes the system of example 19 and/or some other examples herein, wherein, to perform the lookup operation, the baseband circuitry is to operate the eRSS entity to: calculate a hash of the NSI to obtain the CID.

Example 21 includes the system of examples 19-20 and/or some other examples herein, wherein, to extract the NSI, the baseband circuitry is to operate the eRSS entity to: identify a descriptor of the data packet from a layer 2 (L2) protocol stack used for processing the data packet; and retrieve the descriptor from the in-package memory circuitry.

Example 22 includes the system of examples 19-21 and/or some other examples herein, wherein, to send the data packet to the processor core of the multi-core application processor circuitry, the baseband circuitry is to operate the eRSS entity to: control storage of the data packet in a receive (Rx) queue associated with the determined CID, wherein the Rx queue is located in the host platform.

Example 23 includes the system of example 22 and/or some other examples herein, wherein, to send the data packet to the Rx queue, the modem circuitry is to: trigger an interrupt request (IRQ) associated with the Rx queue to notify the processor core associated with the determined CID that the data packet is ready for storage in the Rx queue.

Example 24 includes the system of examples 18-23 and/or some other examples herein, wherein the modem circuitry is to operate as a fourth generation (4G) Long Term Evolution (LTE) modem, and the NSI is an Evolved Packet System (EPS) ID, a Packet Data Network (PDN) ID, an Access Point Name (APN), or a Quality of Service (QoS) Class Identifier (QCI).

Example 25 includes the system of examples 18-23 and/or some other examples herein, wherein the modem circuitry is to operate as a fifth generation (5G) New Radio (NR)

modem, and the NSI is a QoS Flow Identifier (QFI) or a Fifth Generation (5G) QoS Identifier (5QI).

Example 26 includes an apparatus capable of modulation and demodulation of signals, the apparatus comprising: storage means for storing a processor core lookup table (PCLT) in the in-package memory circuitry, wherein the PCLT is to map network-specific identifiers (NSIs) to core identifiers (CIDs) of a plurality of NSI-CIS pairs for a plurality of cores of application processor circuitry of a host platform to which the SoC is coupled; and enhanced receive side scaling (eRSS) means for sending data packets to individual cores of processing means having multiple cores, wherein the individual cores to which data packets are sent are associated with corresponding CIDs obtained from the PCLT based on individual NSIs of the data packets.

Example 27 includes the apparatus of example 26 and/or some other examples herein, wherein the eRSS means is for performing a lookup operation on the PCLT using the NSI of the data packets to obtain the CID of the data packets.

Example 28 includes the apparatus of examples 26-27 and/or some other examples herein, wherein the eRSS means is for extracting the NSI of the data packets from the data packets.

Example 29 includes the apparatus of example 28 and/or some other examples herein, wherein, to extract the NSI, the eRSS means is for extracting the NSI from a Packet Data Convergence Protocol (PDCP) protocol data unit (PDU) header of the data packets.

Example 30 includes the apparatus of examples 26-29 and/or some other examples herein, wherein the eRSS means is for identifying a descriptor of the data packets from a layer 2 (L2) protocol stack used for processing the data packet; and retrieving the descriptor from the in-package memory circuitry.

Example 31 includes the apparatus of example 30 and/or some other examples herein, wherein the eRSS means is located in PDCP means of the L2 protocol stack, or the eRSS entity is located above the PDCP layer.

Example 32 includes the apparatus of examples 26-31 and/or some other examples herein, wherein the eRSS means is for sending the individual data packets to individual cores according to the CIDs of the individual cores.

Example 33 includes the apparatus of example 32 and/or some other examples herein, wherein, to send the data packet to the individual cores, the eRSS means is for controlling storage of the data packets in individual receive (Rx) queues associated with corresponding cores of the individual cores.

34 includes the apparatus of example 33 and/or some other examples herein, wherein the apparatus further comprises interconnect (IX) means for triggering an interrupt request (IRQ) associated with the individual Rx queues to notify the individual cores associated with the determined CIDs that respective data packets are ready for storage in the individual Rx queues.

Example 35 includes the apparatus of examples 26-34 and/or some other examples herein, wherein the NSI is an Evolved Packet System (EPS) ID, a Packet Data Network (PDN) ID, an Access Point Name (APN), a Quality of Service (QoS) Class Identifier (QCI), a QoS Flow Identifier (QFI) or a Fifth Generation (5G) QoS Identifier (5QI).

Example 36 includes a method for enhanced receive side scaling (eRSS) to be performed by a user equipment (UE), the method comprising: extracting, by the UE from each obtained data packet of a data stream, a network-specific identifier (NSI) of each obtained data packet or an NSI associated with the data stream; performing, by the UE, a lookup operation on an indirection table using the extracted NSI to obtain a CID, wherein the indirection table is to store a plurality of CIDs in association with a corresponding NSI, wherein each CID of the plurality of CIDs corresponds with a processor core of a plurality of processor cores of multi-core processor circuitry; and sending, by the UE, the data packet to be stored in a receive (Rx) queue associated with the obtained CID.

Example 37 includes the method of example 36 and/or some other examples herein, wherein performing the lookup operation comprises: calculating, by the UE, a hash of the NSI to obtain the CID.

Example 38 includes the method of examples 36-37 and/or some other examples herein, wherein extracting the NSI comprises: identifying, by the UE, a descriptor of the data packet from a layer 2 (L2) protocol stack used for processing the data packet; and retrieving, by the UE, the descriptor from the in-package memory circuitry.

Example 39 includes the method of example 38 and/or some other examples herein, wherein the eRSS entity is located in a Packet Data Convergence Protocol (PDCP) layer of the L2 protocol stack, or the eRSS entity is located above the PDCP layer, and extracting the NSI comprises: extracting, by the UE, the NSI from a PDCP protocol data unit (PDU) header of the data packet.

Example 40 includes the method of examples 36-39 and/or some other examples herein, wherein sending the data packet to be stored in the Rx queue comprises: issuing, by the UE, a deferred procedure call (DPC) associated with the Rx queue.

Example 41 includes the method of examples 36-40 and/or some other examples herein, wherein sending the data packet to be stored in the Rx queue comprises: triggering, by the UE, an interrupt request (IRQ) associated with the Rx queue to notify the processor core associated with the obtained CID that the data packet is ready for storage in the Rx queue.

Example 42 includes the method of examples 36-41 and/or some other examples herein, wherein the NSI is an Evolved Packet System (EPS) identity, a Packet Data Network (PDN) identity, an Access Point Name (APN), or a Quality of Service (QoS) Class Identifier (QCI), a QoS Flow Identifier (QFI), or a Fifth Generation (5G) QoS Identifier (5QI).

Example 43 includes a computer system capable of wireless communication, the system comprising: application processing means comprising multiple processing cores and memory means; and modem means coupled with the application processing means via interconnect (IX) means, wherein the modem means comprises enhanced receive side scaling (eRSS) means for routing data packets to individual processing cores of application processing means via the IX means based on network-specific identifiers (NSIs) of the data packets.

Example 44 includes the system of example 43 and/or some other examples herein, wherein the modem means comprises processing core lookup means for mapping NSIs to core identifiers (CIDs) of a plurality of NSI-CIS pairs for the individual processing cores, and the eRSS means is for: extracting individual NSIs from individual data packets; performing a lookup operation on the processing core lookup means using the extracted NSI; obtaining individual CIDs of the individual data packets from the processing core lookup means based on the lookup operation; and sending the data packets to corresponding ones of the individual processing cores based on the individual CIDs.

Example 45 includes the system of example 44 and/or some other examples herein, wherein the eRSS means is for calculating a hash of the NSI to obtain the CID during the lookup operation.

Example 46 includes the system of examples 44-45 and/or some other examples herein, wherein the eRSS means is for: identifying a descriptor of the data packet from a layer 2 (L2) protocol stack used for processing the data packet; and retrieving the descriptor from the in-package memory circuitry.

Example 47 includes the system of examples 44-46 and/or some other examples herein, wherein, to send the data packets to the processing cores the eRSS means is for controlling storage of the data packets in individual receive (Rx) queues associated with corresponding ones of the individual processing cores.

Example 48 includes the system of example 47 and/or some other examples herein, wherein, to send the data packets to the Rx queues the eRSS means is for: triggering an interrupt request (IRQ) associated with the individual Rx queues to notify the processing cores associated with the determined CID that the data packets is/are ready for storage in the individual Rx queues.

Example 49 includes the system of examples 43-48 and/or some other examples herein, wherein the modem means is for operating according to fourth generation (4G) Long Term Evolution (LTE) protocols, and the NSI is an Evolved Packet System (EPS) ID, a Packet Data Network (PDN) ID, an Access Point Name (APN), or a Quality of Service (QoS) Class Identifier (QCI).

Example 50 includes the system of examples 43-48 and/or some other examples herein, wherein the modem means is for operating according to fifth generation (5G) New Radio (NR) protocols, and the NSI is a QoS Flow Identifier (QFI) or a Fifth Generation (5G) QoS Identifier (5QI).

Example 51 may include an apparatus comprising means to perform one or more elements of a method described in or related to any of examples 1-50, or any other method or process described herein.

Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described herein.

Example 53 may include an apparatus comprising logic, modules, or circuitry to perform one or more elements of a method described in or related to any of examples 1-50, or any other method or process described herein.

Example 54 may include a method, technique, or process as described in or related to any of examples 1-50, or portions or parts thereof.

Example 55 may include an apparatus comprising: one or more processors and one or more computer readable media comprising instructions that, when executed by the one or more processors, cause the one or more processors to perform the method, techniques, or process as described in or related to any of examples 1-50, or portions thereof.

Example 56 may include a signal as described in or related to any of examples 1-50, or portions or parts thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, aspects of the present disclosure may take the form of a computer program product embodied in any tangible or non-transitory medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

What is claimed is:

1. A system on chip (SoC) for wireless communication modulation and demodulation, the SoC comprising:
baseband circuitry coupled with in-package memory circuitry, wherein:
the in-package memory circuitry is arranged to store a processor core lookup table (PCLT), wherein the PCLT maps network-specific identifiers (NSIs) to core identifiers (CIDs) of a plurality of NSI-CIS pairs for a plurality of cores of application processor circuitry of a host platform to which the SoC is coupled, the NSIs being identifiers specific to a wireless communication protocol used to communicate data packets, and
the baseband circuitry is arranged to operate an enhanced receive side scaling (eRSS) entity to send a data packet to a processor core of the multi-core application processor circuitry that is associated with a CID obtained from the PCLT based on an NSI of the data packet.

2. The SoC of claim 1, wherein the baseband circuitry is arranged to operate the eRSS entity to:
perform a lookup operation on the PCLT using the NSI of the data packet to obtain the CID of the data packet.

3. The SoC of claim 2, wherein, to perform the lookup operation, the baseband circuitry is arranged to operate the eRSS entity to:
calculate a hash of the NSI to obtain an index; and
use the index to obtain the CID of the data packet.

4. The SoC of claim 1, wherein the baseband circuitry is arranged to operate the eRSS entity to:
extract the NSI of the data packet from the data packet.

5. The SoC of claim 4, wherein, to extract the NSI, the baseband circuitry is arranged to operate the eRSS entity to:
 extract the NSI from a Packet Data Convergence Protocol (PDCP) protocol data unit (PDU) header of the data packet.

6. The SoC of claim 1, wherein the in-package memory circuitry comprises a cache memory device, and wherein the baseband circuitry is arranged to operate the eRSS entity to:
 identify a descriptor of the data packet from a layer 2 (L2) protocol stack used for processing the data packet; and
 retrieve the descriptor from the in-package memory circuitry,
 wherein the eRSS entity is located in a PDCP layer of the L2 protocol stack, or the eRSS entity is located above the PDCP layer.

7. The SoC of claim 1, wherein, to send the data packet to the processor core of the multi-core application processor circuitry, the baseband circuitry is arranged to:
 control storage of the data packet in a receive (Rx) queue associated with the determined CID, wherein the Rx queue is located in the host platform.

8. The SoC of claim 7, wherein the SoC further comprises interconnect (IX) interface circuitry, and wherein, to control storage of the data packet in the Rx queue, the IX interface circuitry is arranged to:
 trigger an interrupt request (IRQ) associated with the Rx queue to notify the processor core associated with the determined CID that the data packet is ready for storage in the Rx queue.

9. The SoC of claim 1, wherein the SoC is to operate as a fourth generation (4G) Long Term Evolution (LTE) modem, and the NSI is an Evolved Packet System (EPS) ID, a Packet Data Network (PDN) ID, an Access Point Name (APN), or a Quality of Service (QoS) Class Identifier (QCI), or wherein the SoC is to operate as a fifth generation (5G) New Radio (NR) modem, and the NSI is a QoS Flow Identifier (QFI) or a Fifth Generation (5G) QoS Identifier (5QI).

10. A system on chip (SoC) for wireless communication modulation and demodulation, the SoC comprising:
 baseband circuitry with in-package memory circuitry, the baseband circuitry is arranged to:
  control storage of a processor core lookup table (PCLT) in the in-package memory circuitry, wherein the PCLT is to map network-specific identifiers (NSIs) to core identifiers (CIDs) of a plurality of NSI-CIS pairs for a plurality of cores of application processor circuitry of a host platform to which the SoC is coupled, and
  operate an enhanced receive side scaling (eRSS) entity to send a data packet to a processor core of the multi-core application processor circuitry that is associated with a CID obtained from the PCLT based on an NSI of the data packet,
  wherein the in-package memory circuitry comprises a cache memory device, and the baseband circuitry is arranged to operate the eRSS entity to:
  identify a descriptor of the data packet from a layer 2 (L2) protocol stack used for processing the data packet; and
  retrieve the descriptor from the in-package memory circuitry,
  wherein the eRSS entity is located in a PDCP layer of the L2 protocol stack, or the eRSS entity is located above the PDCP layer.

11. The SoC of claim 10, wherein the SoC is to operate as a fourth generation (4G) Long Term Evolution (LTE) modem, and the NSI is an Evolved Packet System (EPS) ID, a Packet Data Network (PDN) ID, an Access Point Name (APN), or a Quality of Service (QoS) Class Identifier (QCI), or wherein the SoC is to operate as a fifth generation (5G) New Radio (NR) modem, and the NSI is a QoS Flow Identifier (QFI) the SoC further comprises interconnect (IX) interface circuitry, and wherein:
 the baseband circuitry is arranged to control storage of the data packet in a receive (Rx) queue associated with the determined CID, wherein the Rx queue is located in the host platform, and
 the IX interface circuitry is arranged to trigger an interrupt request (IRQ) associated with the Rx queue to notify the processor core associated with the determined CID that the data packet is ready for storage in the Rx queue.

12. One or more non-transitory computer-readable storage media (NTCRSM) comprising instructions, wherein execution of the instructions by circuitry of a user equipment (UE) is to cause the UE to operate an enhanced receive side scaling (eRSS) entity of the UE to:
 extract, from each obtained data packet of a data stream, a network-specific identifier (NSI) of each obtained data packet or an NSI associated with the data stream, the NSI is an identifier specific to a wireless communication protocol used to communicate data packets of the data stream;
 perform a lookup operation on an indirection table using the extracted NSI to obtain a CID, wherein the indirection table is to store a plurality of CIDs in association with a corresponding NSI, wherein each CID of the plurality of CIDs corresponds with a processor core of a plurality of processor cores of multi-core processor circuitry; and
 control storage of the data packet in a receive (Rx) queue associated with the obtained CID.

13. The one or more NTCRSM of claim 12, wherein, to perform the lookup operation, execution of the instructions is to cause the UE to operate the eRSS entity to:
 calculate a hash of the NSI to obtain an index; and
 use the index to obtain the CID of the data packet.

14. The one or more NTCRSM of claim 12, wherein, to extract the NSI, execution of the instructions is to cause the UE to operate the eRSS entity to:
 identify a descriptor of the data packet from a layer 2 (L2) protocol stack used for processing the data packet; and
 retrieve the descriptor from in-package memory circuitry.

15. The one or more NTCRSM of claim 14, wherein the eRSS entity is located in a Packet Data Convergence Protocol (PDCP) layer of the L2 protocol stack, or the eRSS entity is located above the PDCP layer, and wherein, to extract the NSI, execution of the instructions is to cause the UE to operate the eRSS entity to:
 extract the NSI from a PDCP protocol data unit (PDU) header of the data packet.

16. The one or more NTCRSM of claim 12, wherein, to control storage of the data packet in the Rx queue, execution of the instructions is to cause the UE to operate the eRSS entity to:
 issue a deferred procedure call (DPC) associated with the Rx queue.

17. The one or more NTCRSM of claim 12, wherein, to control storage of the data packet in the Rx queue, execution of the instructions is to cause the UE to operate the eRSS entity to:

trigger an interrupt request (IRQ) associated with the Rx queue to notify the processor core associated with the obtained CID that the data packet is ready for storage in the Rx queue.

18. The one or more NTCRSM of claim 12, wherein the NSI is an Evolved Packet System (EPS) identity, a Packet Data Network (PDN) identity, an Access Point Name (APN), or a Quality of Service (QoS) Class Identifier (QCI), a QoS Flow Identifier (QFI), or a Fifth Generation (5G) QoS Identifier (5QI).

19. A computer system capable of wireless communication, the system comprising:
a host platform comprising multi-core processor circuitry and system memory circuitry; and
modem circuitry coupled with the host platform via an interconnect (IX), wherein the modem circuitry comprises baseband circuitry and in-package memory circuitry, and wherein:
the in-package memory circuitry is arranged to store an enhanced receive side scaling (eRSS) entity, and
the baseband circuitry is arranged to operate the eRSS entity to route data packets to individual cores of the multi-core processor circuitry over the IX based on network-specific identifiers (NSIs) of the data packets, the NSIs being identifiers specific to a wireless communication protocol used to communicate data packets of a data stream.

20. The system of claim 19, wherein the in-package memory circuitry is arranged to store a processor core lookup table (PCLT), wherein the PCLT is to map NSIs to core identifiers (CIDs) of a plurality of NSI-CIS pairs for the individual cores, and the baseband circuitry is arranged to operate the eRSS entity to:
extract, from a data packet received by the baseband circuitry, a NSI of the data packet;
perform a lookup operation on the PCLT using the extracted NSI to obtain a CID; and
send the data packet to a processor core of the multi-core processor circuitry that is associated with the determined CID.

21. The system of claim 20, wherein, to perform the lookup operation, the baseband circuitry is arranged to operate the eRSS entity to:
calculate a hash of the NSI to obtain the CID.

22. The system of claim 20, wherein, to extract the NSI, the baseband circuitry is arranged to operate the eRSS entity to:
identify a descriptor of the data packet from a layer 2 (L2) protocol stack used for processing the data packet; and
retrieve the descriptor from the in-package memory circuitry.

23. The system of claim 20, wherein, to send the data packet to the processor core of the multi-core processor circuitry, the baseband circuitry is arranged to operate the eRSS entity to:
control storage of the data packet in a receive (Rx) queue associated with the determined CID, wherein the Rx queue is located in the host platform.

24. The system of claim 23, wherein, to send the data packet to the Rx queue, the modem circuitry is arranged to:
trigger an interrupt request (IRQ) associated with the Rx queue to notify the processor core associated with the determined CID that the data packet is ready for storage in the Rx queue.

25. The system of claim 19, wherein the modem circuitry is to operate as a fourth generation (4G) Long Term Evolution (LTE) modem, and the NSI is an Evolved Packet System (EPS) ID, a Packet Data Network (PDN) ID, an Access Point Name (APN), or a Quality of Service (QoS) Class Identifier (QCI), or the modem circuitry is to operate as a fifth generation (5G) New Radio (NR) modem, and the NSI is a QoS Flow Identifier (QFI).

* * * * *